United States Patent
Ibrahim et al.

(10) Patent No.: US 12,113,752 B2
(45) Date of Patent: Oct. 8, 2024

(54) CELL-GROUP SLOT FORMAT INDICATION (SFI)

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Ahmed Attia Abotabl, San Diego, CA (US); Wanshi Chen, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 68 days.

(21) Appl. No.: 17/198,011

(22) Filed: Mar. 10, 2021

(65) Prior Publication Data

US 2022/0294597 A1    Sep. 15, 2022

(51) Int. Cl.
*H04L 5/14* (2006.01)
*H04L 41/0893* (2022.01)
(Continued)

(52) U.S. Cl.
CPC .......... *H04L 5/14* (2013.01); *H04L 41/0893* (2013.01); *H04W 72/12* (2013.01); *H04W 72/23* (2023.01)

(58) Field of Classification Search
None
See application file for complete search history.

(56) References Cited

U.S. PATENT DOCUMENTS 5,551,063 A * 8/1996 Brandon ............... H04W 84/08
455/520
9,480,096 B1 * 10/2016 Lee ..................... H04W 12/065
(Continued)

FOREIGN PATENT DOCUMENTS

WO    WO-2020016934 A1    1/2020
WO    WO-2020029945 A1 *  2/2020 ........... H04L 5/0044

OTHER PUBLICATIONS 01-e-NR-unlic-NRU-DL_Signals_and_Channels-02] on DCI format 2_0, COT indication and RB set indication (Year: 2020).*
(Continued)

*Primary Examiner* — Kodzovi Acolatse
*Assistant Examiner* — Anindita Sen
(74) *Attorney, Agent, or Firm* — Norton Rose Fullbright US LLP

(57) ABSTRACT

Systems, methods, and devices for wireless communication that support cell-group slot format indication (SFI) facilitating dynamic cross-cell operation are described. Cell-group SFI information of some examples supports full duplex operation implemented using cross-cell communication techniques. Devices may be provided with information regarding cell-groups and information regarding cell slot formats for cells in the cell-groups. For example, cell-group SFI may be provided for switching slot (symbol) types across cells for a number of slots, wherein a base station may define a cell-group and a cell-group SFI applies to cells within the cell-group. Cell-group SFI information may indicate cell slot formats for each cell of a selected cell-group to provide a device with slot formats used with respect to the cells of the cell-group. Other aspects and features are also claimed and described.

30 Claims, 15 Drawing Sheets

(51) Int. Cl.
*H04W 72/12* (2023.01)
*H04W 72/23* (2023.01)

(56) References Cited

U.S. PATENT DOCUMENTS

| | | | |
|---|---|---|---|
| 9,998,895 B1* | 6/2018 | Schuler | H04W 4/02 |
| 11,395,149 B2* | 7/2022 | Montalvo | H04W 72/0453 |
| 11,424,995 B1* | 8/2022 | Cartsonis | H04L 41/40 |
| 2013/0078909 A1* | 3/2013 | Smith | H04M 1/0264 |
| | | | 455/7 |
| 2013/0308612 A1* | 11/2013 | Cai | H04L 1/0073 |
| | | | 370/336 |
| 2014/0342780 A1* | 11/2014 | Ruegg | H04M 1/026 |
| | | | 455/566 |
| 2016/0214020 A1* | 7/2016 | Fujimoto | A63F 13/35 |
| 2017/0347392 A1* | 11/2017 | Cushing | H04W 88/06 |
| 2019/0132294 A1* | 5/2019 | Li | H04W 12/02 |
| 2019/0149380 A1* | 5/2019 | Babaei | H04W 72/23 |
| | | | 370/330 |
| 2019/0188328 A1* | 6/2019 | Oyenan | G06F 16/9535 |
| 2020/0213068 A1* | 7/2020 | Jo | H04W 72/0446 |
| 2020/0374967 A1* | 11/2020 | Nogami | H04W 72/0446 |
| 2020/0382913 A1* | 12/2020 | Hasegawa | H04W 48/06 |
| 2020/0404434 A1* | 12/2020 | Shriner | H04R 25/65 |
| 2021/0153197 A1* | 5/2021 | Huang | H04L 27/26025 |
| 2021/0281982 A1* | 9/2021 | Drury | H04W 4/10 |
| 2021/0368481 A1* | 11/2021 | Jo | H04W 72/04 |
| 2022/0060277 A1* | 2/2022 | Wei | H04L 5/0083 |
| 2022/0132534 A1* | 4/2022 | Jang | H04L 5/0044 |
| 2022/0217661 A1* | 7/2022 | Yokomakura | H04B 7/155 |
| 2022/0266133 A1* | 8/2022 | Mawdesley | G07F 17/3225 |
| 2022/0271180 A1* | 8/2022 | Zhao | H01L 31/0747 |
| 2022/0271798 A1* | 8/2022 | Wobak | H02J 50/80 |
| 2022/0272464 A1* | 8/2022 | Das | H04R 25/40 |
| 2022/0272547 A1* | 8/2022 | Noh | H04W 72/20 |

OTHER PUBLICATIONS

International Search Report and Written Opinion—PCT/US2022/070511—ISA/EPO—May 5, 2022.
NTT Docomo, Inc: "Remaining Details on Group-Common PDCCH", R1-1720813, 3GPP TSG RAN WG1 Meeting 91, 3rd Generation Partnership Project, Mobile Competence Centre, 650, Route Des Lucioles, F-06921 Sophia-Antipolis Cedex, France, vol. RAN WG1, No. Reno, USA, Nov. 27, 2017-Dec. 1, 2017 Nov. 18, 2017, pp. 1-7, XP051370242.

* cited by examiner

FIG. 14

Cell0, Cell1, Cell2

Corresponding Block of CellsSlotFormat={0 0101 00}

Corresponding Block of CellsSlotFormat={1 0000 11}

Slots

FIG. 15

Cell0, Cell1, Cell2

CellsSlotFormatIndex=0
CellsSlotFormat={0 0 0}

CellsSlotFormatIndex=2
CellsSlotFormat={0 1 0}

Slots

CELL-GROUP SLOT FORMAT INDICATION (SFI)

TECHNICAL FIELD

Aspects of the present disclosure relate generally to wireless communication systems, and more particularly, to cross-cell communication techniques. Certain embodiments of the technology discussed below can enable and provide for cell-group slot format indication (SFI) for dynamic cross-cell operation, such as may support full duplex operation.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. The method may include transmitting, to a user equipment (UE), configuration information regarding one or more cell-groups supporting full duplex communication, an order of cells in each cell-group of the one or more cell groups, and a cells slot format combination table for all cells in a cell-group of the one or more cell-groups. The method may further include transmitting, to the UE, cell-group slot format indication (SFI) information indicating a cells slot format of the cells slot format combination table to indicate to the UE slot formats for all cells in a selected cell-group of the one or more cell-groups.

In an additional aspect of the disclosure, an apparatus configured for wireless communication is provided. The apparatus includes at least one processor, and a memory coupled to the at least one processor. The at least one processor may be configured to transmit, to a UE, configuration information regarding one or more cell-groups supporting full duplex communication, an order of cells in each cell-group of the one or more cell groups, and a cells slot format combination table for all cells in a cell-group of the one or more cell-groups. The at least one processor may further be configured to transmit, to the UE, cell-group SFI information indicating a cells slot format of the cells slot format combination table to indicate to the UE slot formats for all cells in a selected cell-group of the one or more cell-groups.

In an additional aspect of the disclosure, an apparatus configured for wireless communication is provided. The apparatus may include means for transmitting, to a UE, configuration information regarding one or more cell-groups supporting full duplex communication, an order of cells in each cell-group of the one or more cell groups, and a cells slot format combination table for all cells in a cell-group of the one or more cell-groups. The apparatus may further include means for transmitting, to the UE, cell-group SFI information indicating a cells slot format of the cells slot format combination table to indicate to the UE slot formats for all cells in a selected cell-group of the one or more cell-groups.

In an additional aspect of the disclosure, a non-transitory computer-readable medium stores instructions for wireless communication is provided. When executed by a processor, the instructions may cause the processor to perform operations including transmitting, to a UE, configuration information regarding one or more cell-groups supporting full duplex communication, an order of cells in each cell-group of the one or more cell groups, and a cells slot format combination table for all cells in a cell-group of the one or more cell-groups. The operations may further include transmitting, to the UE, cell-group SFI information indicating a cells slot format of the cells slot format combination table to indicate to the UE slot formats for all cells in a selected cell-group of the one or more cell-groups.

In an additional aspect of the disclosure, a method of wireless communication is provided. The method may include receiving, from one or more base stations, configuration information regarding one or more cell-groups supporting full duplex communication, an order of cells in each cell-group of the one or more cell groups, and a cells slot format combination table for all cells in a cell-group of the one or more cell-groups. The method may further include receiving, from a base station of the one or more base stations, cell-group SFI information indicating a cells slot format of the cells slot format combination table for determining slot formats for all cells in a selected cell-group of the one or more cell-groups.

In an additional aspect of the disclosure, an apparatus configured for wireless communication is provided. The apparatus includes at least one processor, and a memory coupled to the at least one processor. The at least one processor may be configured to receive, from one or more base stations, configuration information regarding one or more cell-groups supporting full duplex communication, an order of cells in each cell-group of the one or more cell groups, and a cells slot format combination table for all cells in a cell-group of the one or more cell-groups. The at least one processor may further be configured to receive, from a base station of the one or more base stations, cell-group SFI information indicating a cells slot format of the cells slot format combination table for determining slot formats for all cells in a selected cell-group of the one or more cell-groups.

In an additional aspect of the disclosure, an apparatus configured for wireless communication is provided. The apparatus may include means for receiving, from one or more base stations, configuration information regarding one or more cell-groups supporting full duplex communication, an order of cells in each cell-group of the one or more cell groups, and a cells slot format combination table for all cells in a cell-group of the one or more cell-groups. The apparatus may further include means for receiving, from a base station of the one or more base stations, cell-group SFI information indicating a cells slot format of the cells slot format combination table for determining slot formats for all cells in a selected cell-group of the one or more cell-groups.

In an additional aspect of the disclosure, a non-transitory computer-readable medium stores instructions for wireless communication is provided. When executed by a processor, the instructions may cause the processor to perform operations including receiving, from one or more base stations, configuration information regarding one or more cell-groups supporting full duplex communication, an order of cells in each cell-group of the one or more cell groups, and a cells slot format combination table for all cells in a cell-group of the one or more cell-groups. The operations may further include receiving, from a base station of the one or more base stations, cell-group SFI information indicating a cells slot format of the cells slot format combination table for determining slot formats for all cells in a selected cell-group of the one or more cell-groups.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 14 is a block diagram illustrating an example of cell-group SFI operation implementing a plurality of blocks comprising a plurality of sequences of different lengths according to one or more aspects.

FIG. 15 is a block diagram illustrating an example of cell-group SFI operation implementing a repetition methodology according to one or more aspects.

Like reference numbers and designations in the various drawings indicate like elements.

DETAILED DESCRIPTION

Figure 1:
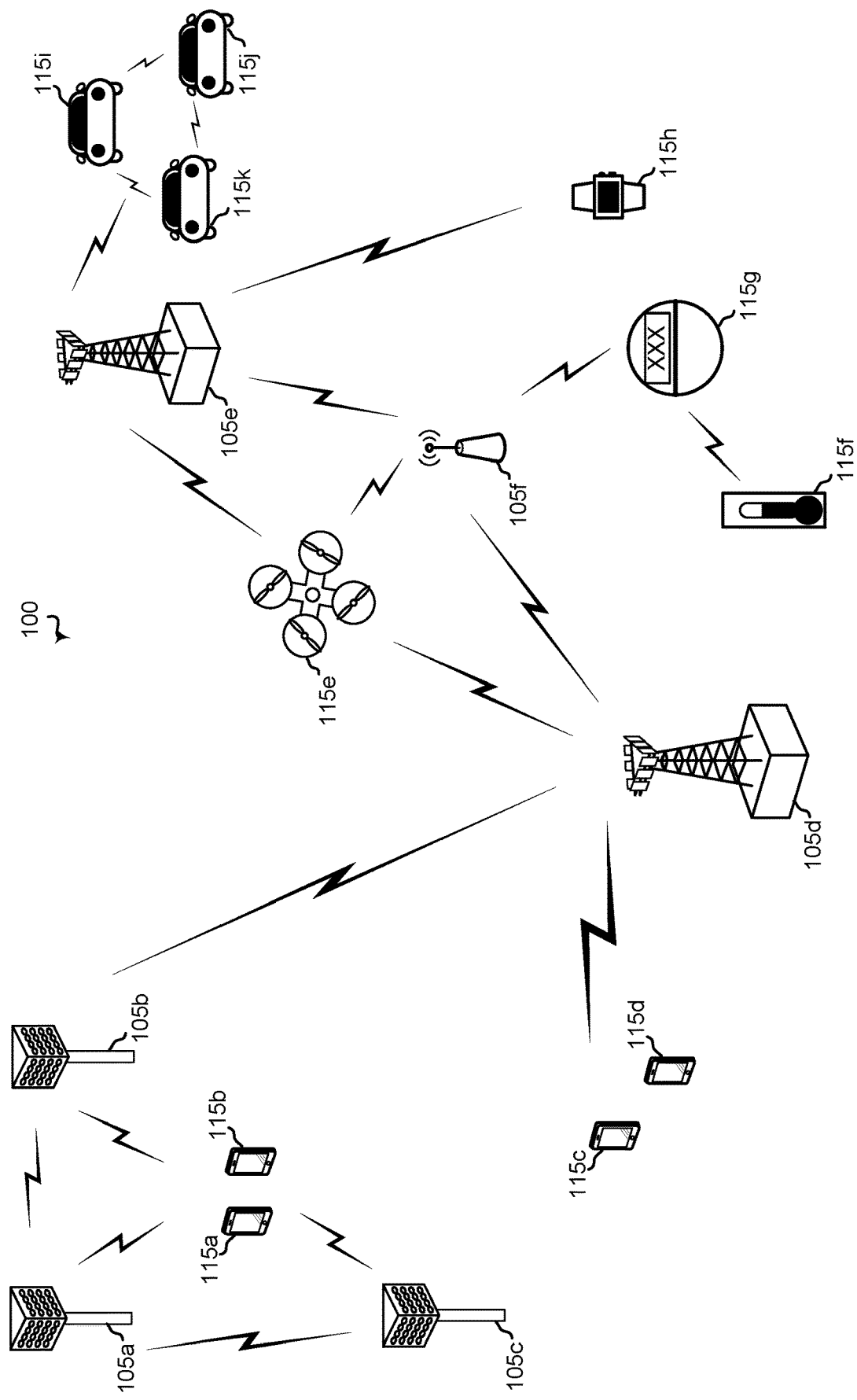
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Devices operating within a wireless network may communicate according to various modes (e.g., half duplex and/or full duplex modes) using one or more component carrier (CC) resources of an active bandwidth part (BWP) configuration. Accordingly, some communication frame time slots may be designated as full duplex (e.g., component carrier bandwidth may be divided into portions for downlink and uplink communications) and others may be designated as half duplex (e.g., component carrier bandwidth may be allocated for either downlink or uplink communications). Slot format indicators, such as may be provided in the form of slot format indication (SFI) information communicated via downlink control information (DCI), may be used to configure specific slot formats for a device in a serving cell.

Intra-cell techniques and cross-cell techniques have been implemented for facilitating in-band full duplex communications at a base station. For example, a same component carriers (CCs) (also referred to as cells in this context) may be used according to an intra-cell technique for an uplink and downlink of a full duplex communication session between devices in a wireless network, whereas multiple cells in the same band may be used for an uplink and downlink of full duplex communications according to a cross-cell technique. According to current solutions, the SFI payload scales with the number of cells. For example, SFI information is to be provided with respect to each of the cells in order to indicate slot types for dynamic full duplex operation using different cells.

Aspects of the present disclosure enable and provide for cell-group SFI facilitating dynamic cross-cell operation. For example, cell-group SFI information of some examples support full duplex operation implemented using cross-cell communication techniques. Devices of a wireless network may be provided with information regarding cell-groups supporting full duplex communication and information regarding cell slot formats (e.g., one or more slot format tables) for cells in the cell-groups. Cell-group SFI information provided according to aspects of the disclosure may indicate cell slot formats for each cell of a selected cell-group to provide a device of the wireless device with slot formats used with respect to the cells of the selected cell-group.

Particular implementations of the subject matter described in this disclosure may be implemented to realize one or more of the following potential advantages or benefits. In some aspects, the present disclosure provides techniques for reducing overhead with respect to cross-cell operation. For example, aspects of the disclosure provide a cell-group SFI for switching slot (symbol) types across cells for a number of slots, wherein a base station may define a cell-group and a SFI applies to cells within the cell-group. Cell-group SFIs provided according to concepts of the disclosure reduce the SFI overhead used for dynamic full duplex operation. According to some aspects, bandwidth utilized with respect to SFI information of cell-group SFIs does not scale (e.g., remains constant) with the number of cells utilized in different cross-cell configurations.

It can be appreciated from the above that this disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The $3^{rd}$ Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "$3^{rd}$ Generation Partnership Project" (3GPP), and cdma2000 is described in documents from an organization named "$3^{rd}$ Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of Things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station, a base station subsystem serving the coverage area, or a particular CC used in providing communication with respect to a particular geographic coverage area of a base station, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of Everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
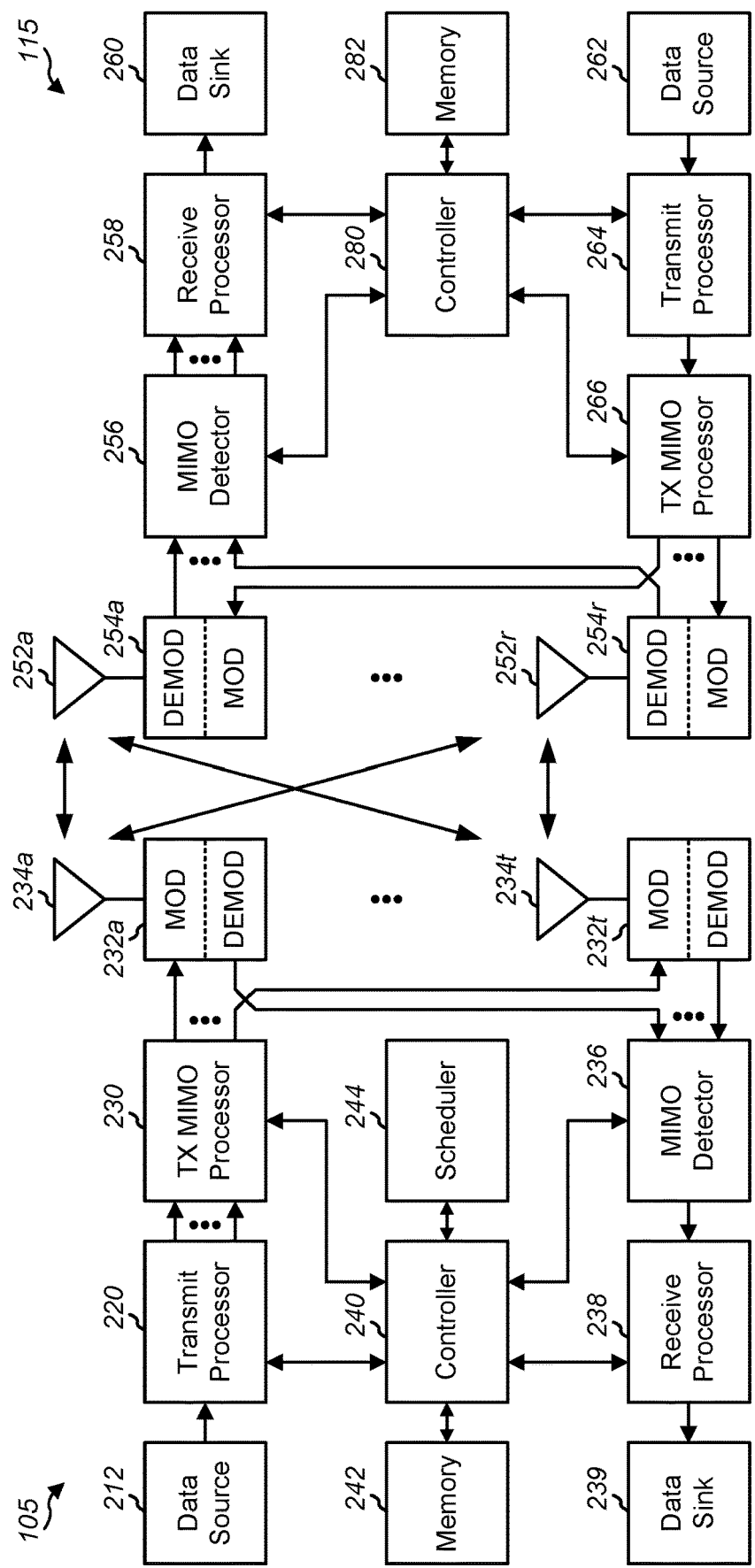
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 10 and 11, or other processes for the techniques described herein. Memories 242 and 282 may store data and program codes for base station 105 and UE 115, respectively. Scheduler 244 may schedule UEs for data transmission on the downlink or the uplink.

Figure 3:
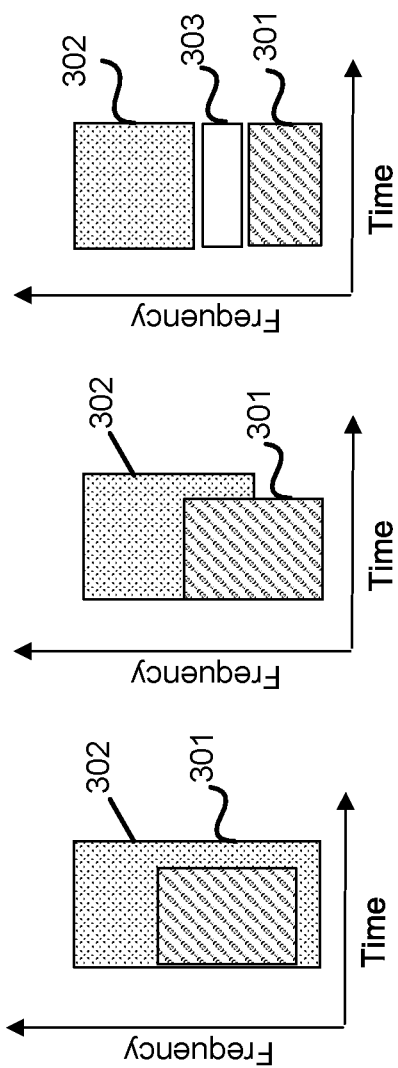
FIGS. 3A-3C illustrate various configurations of duplex modes as may be utilized by wireless communication stations according to one or more aspects.

Wireless devices (e.g., one or more of UEs 115 and/or base station 105) of wireless network 100 may operate in half duplex mode or full duplex mode. FIGS. 3A-3C illustrate various configurations of full duplex modes in a single component carrier as may be utilized by wireless communication stations of 5G network 100. It should be appreciated that FIGS. 3A-3C present examples with respect to duplex mode configurations that may be utilized and are not intended to be limiting with respect to the particular duplex mode configurations that may be utilized by wireless communication stations that may implement full duplex operation according to concepts of the disclosure.

As can be seen in FIGS. 3A-3C, uplink signals 301 of the full duplex modes overlap downlink signals 302 in time. That is, in these examples, a wireless communication station implementing a full duplex mode with respect to wireless communications transmits and receives at the same time.

Various configurations may be utilized with respect to a full duplex mode, as represented by the examples of FIGS. 3A-3C. For example, FIGS. 3A and 3B show examples of in-band full duplex, wherein uplink signals 301 of the full duplex modes overlap downlink signals 302 in time and frequency. That is the uplink signals and downlink signals at least partially share the same time and frequency resource (e.g., full or partial overlap of the uplink and downlink signals in the time and frequency domains). In another configuration of a full duplex mode, FIG. 3C shows an example of sub-band full duplex, wherein uplink signal 301 of the full duplex mode overlaps downlink signal 302 in time, but not in frequency. That is the uplink signals and downlink signals at least partially share the same time resource (e.g., full or partial overlap of the uplink and downlink signals in the time domain), but do not share the same frequency resource. In the example illustrated in FIG. 3C, uplink signal 301 and downlink signal 302 are separated in the frequency domain by guard band 303 (e.g., a relatively narrow amount of frequency spectrum separating the frequency band occupied by the uplink and downlink signals).

In operation of wireless communication within wireless network 100, some communication frame time slots may be utilized with respect to full duplex communications and others may be utilized with respect to half duplex communications. For half duplex communications, the downlink and uplink transmissions may be timewise non-overlapping (e.g., occur separated in time, like TDD operation). Component carrier, also referred to as a cell in this context, bandwidth (e.g., frequency resources of a cell) may thus be allocated for either downlink or uplink communications with respect to half duplex time slots. For full duplex communications, the downlink and uplink transmissions may overlap in time (e.g., occur simultaneously, like FDD operation). Cell bandwidth may thus be divided into portions for downlink and uplink communications with respect to full duplex time slots. In accordance with an in-band full duplex implementation, the downlink and uplink transmissions of a full duplex slot may occur in overlapping frequency bands (e.g., as shown in the examples of FIGS. 3A and 3B). In accordance with a sub-band full duplex implementation, the downlink and uplink transmissions of a full duplex slot may occur in adjacent frequency bands (e.g., as shown in the example of FIG. 3C).

A full duplex slot (also referred to herein as a D+U slot) format may be implemented in which the cell bandwidth may be used for both uplink and downlink transmissions. A full duplex slot implemented according to a full duplex slot format of some aspects may, for example, contain uplink symbols, downlink symbols, or a combination of uplink symbols and downlink symbols.

Figure 4:
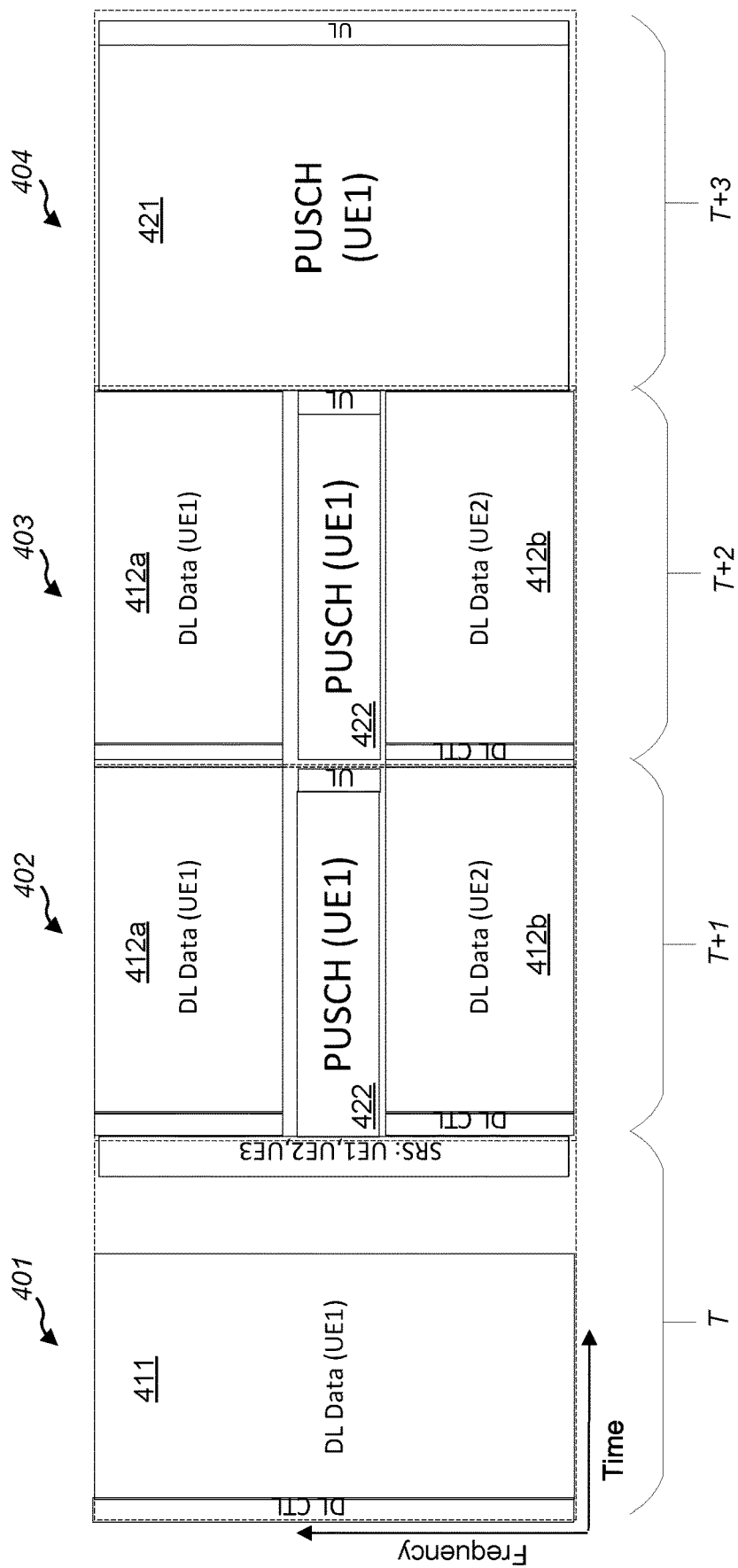
FIG. 4 is a block diagram illustrating instances of half duplex slots and full duplex slots according to one or more aspects.

FIG. 4 shows instances of half duplex slots according to aspects of the present disclosure. For example, downlink slot 401, shown in the example of FIG. 4 at time T of the illustrated frame or subframe, implements a downlink slot format in which downlink only symbols are contained (e.g., the full bandwidth of BWP 411 for a cell may be used for downlink only symbol transmission). Similarly, uplink slot 404, shown in the example of FIG. 4 at time T+3, implements an uplink slot format in which uplink only symbols are contained (e.g., the full bandwidth of BWP 421 for a cell may be used for uplink only symbol transmission).

Full duplex slots in which both uplink and downlink transmission is provided are also shown in FIG. 4. In particular, D+U slots 402 and 403 are shown at times T+1 and T+2 of the frame or subframe in the example of FIG. 4. D+U slots 402 and 403 show examples in which full duplex symbols are contained in the D+U slot (e.g., the bandwidth of BWP 412 may be used for downlink symbol transmission and the bandwidth of BWP 422 may be used for uplink symbol transmission). The bandwidth of BWP 412 used for downlink transmission and the bandwidth of BWP 422 used for uplink transmission may comprise spectrum of a same cell, spectrum of paired cells, and/or spectrum of unpaired cells according to some aspects of the disclosure (e.g., D+U slots may provide for intra-cell full duplex operation in which a same cell is used for an uplink and downlink and/or cross-cell full duplex operation in which multiple cells are used for an uplink and downlink of the full duplex communications).

In a given D+U symbol, a full duplex UE may transmit in the uplink band and/or receive in the downlink band in the same slot. For example, D+U slots 402 and 403 show an example in which UE1 (e.g., an instance of UE 115 operating in wireless network 100 of FIG. 1) receives downlink symbols transmitted using portion 412a of downlink BWP 412 and transmits uplink symbols using uplink BWP 422. Similarly, in a given D+U symbol, a half duplex UE may either transmit in the uplink band or receive in the downlink band. For example, D+U slots 402 and 403 further show an example in which UE2 (e.g., another instance of UE 115 operating in wireless network 100 of FIG. 1) receives downlink symbols transmitted using portion 412b of downlink BWP 412.

As can be seen in the example of D+U slots 402 and 403, full duplex slots implemented according to aspects of the disclosure may be utilized for uplink and/or downlink communication by multiple wireless devices (e.g., a plurality of UEs and/or a plurality of base stations) of either or both ends of the communication link. Alternatively, a full duplex slot may be utilized for uplink and downlink communication by a single wireless device at each end of the communication link. For example, a single base station operating in full duplex mode may communicate with multiple UEs (e.g., multiple half duplex UEs, multiple full duplex UEs, a combination of half duplex and full duplex UEs, etc.) using a full duplex slot according to aspects of the disclosure. As another example, a single UE operating in full duplex mode may communicate with multiple base stations (e.g., multiple half duplex base stations, multiple full duplex base stations, a combination of half duplex and full duplex base stations, etc.) using a full duplex slot. As yet another example, a single base station operating in full duplex mode may communicate with a single UE operating in full duplex mode using a full duplex slot.

Although the full duplex slots provided by the examples of D+U slots 402 and 403 in FIG. 4 show the downlink band segmented (e.g., as portions 412a and 412b of BWP 412) and the uplink band unsegmented (e.g., as BWP 422), full duplex slots provided according to aspects of the present disclosure may have different configurations. For example, the uplink band may be segmented and/or the downlink band may be unsegmented.

Figure 5:
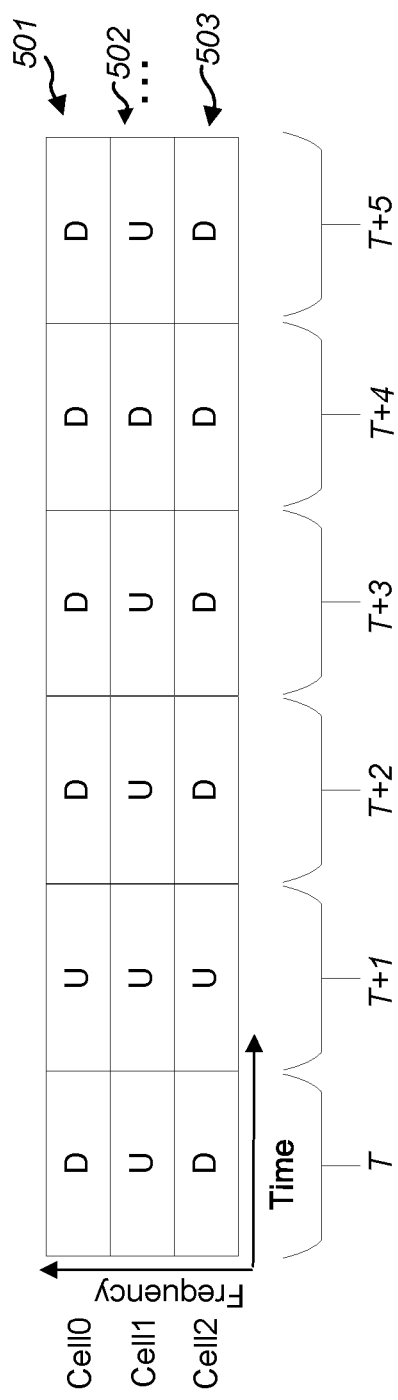
FIGS. 5 and 6 are block diagrams illustrating examples of cross-cell full duplex operation according to one or more aspects.
Figure 6:
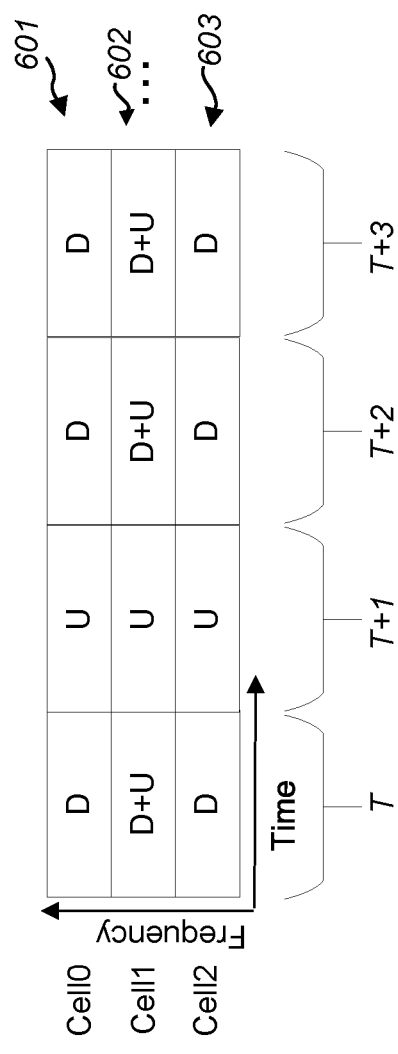

FIGS. 5 and 6 show examples of cross-cell full duplex operation according to aspects of the present disclosure. The sequences in the examples of FIGS. 5 and 6 (e.g., sequences 501-503 of FIG. 5 and sequences 601-603 of FIG. 6) represent communication frame time slots for respective cells. For example, the slots of sequence 501 may correspond to a first cell (e.g., Cell0), the slots of sequence 502 may correspond to a second cell (e.g., Cell1), and the slots of sequence 503 may correspond to a third cell (e.g., Cell2). Similarly, the slots of sequence 601 may correspond to a first cell (e.g., Cell0), the slots of sequence 602 may correspond to a second cell (e.g., Cell1), and the slots of sequence 603 may correspond to a third cell (e.g., Cell2). The cells of the examples in FIGS. 5 and 6 may correspond to one or more base stations (e.g., one or more base stations 105 of wireless network 100 in FIG. 1) and may serve one or more UEs (e.g., one or more UEs 115 in FIG. 1). The cells (e.g., Cell0, Cell1, and Cell2) utilized in providing cross-cell full duplex operation according to some aspects may implement a same or different SFI reference subcarrier spacing (SCS). For example, in FR1 SFI reference SCS takes values {0,1,2} and in FR2 SFI reference SCS takes values {2,3}.

Cross-cell full duplex techniques implemented according to aspects of the present disclosure may implement sub-band full duplex operation (e.g., as shown in FIG. 3C) and/or in-band full duplex operation (e.g., as shown in FIGS. 3A and 3B). For example, the cells of sequences 501-503 in FIG. 5 may implement a cross-cell communication technique using sub-band full duplex operation at times T, T+2, T+3, and T+5. As another example, a cell of sequence 602 in FIG. 6 may implement a cross-cell communication technique using in-band full duplex operation at times T, T+2, and T+3. Further, the cells of sequences 601-603 may implement a cross-cell communication technique using sub-band full duplex operation at times T, T+2, and T+3.

Figure 7:
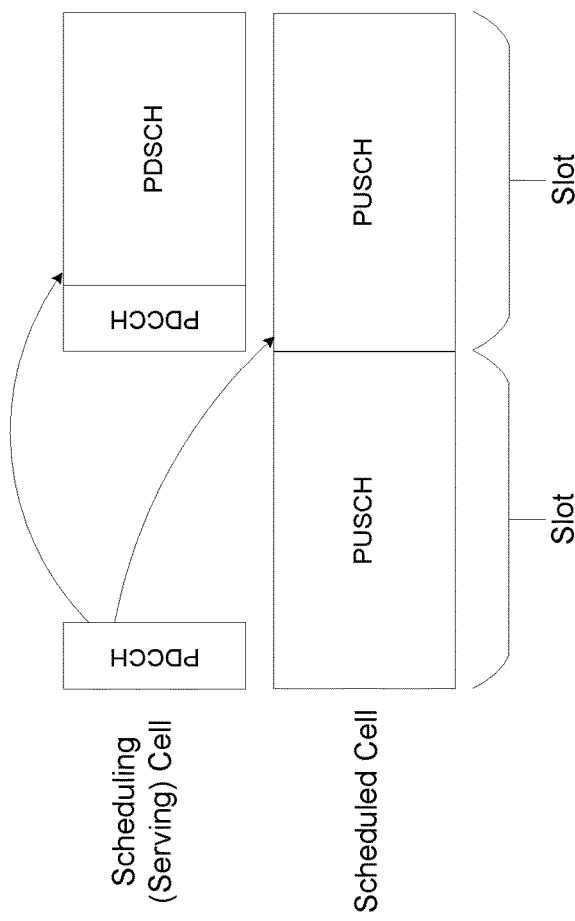
FIG. 7 is a block diagram illustrating an example of a scheduling or serving cell carrying scheduling information for scheduling communication with respect to uplink and/or downlink channels according to one or more aspects.

As can be appreciated from the examples shown in FIGS. 5 and 6, various slot formats may be utilized with respect to communications within wireless network 100. 5G NR wireless networks typically provide an uplink slot format (shown as U in FIGS. 5 and 6) providing for uplink only symbols, a downlink slot format (shown as D in FIGS. 5 and 6) providing for downlink only symbols, and a flexible slot format providing for either uplink only symbols or downlink only symbols. Moreover, according to aspects of the present disclosure, some slots may be designated as full duplex (e.g., D+U slots in which component carrier bandwidth is divided into portions for downlink and uplink communications). Accordingly, slot format indicators, such as may be provided in the form of SFI information communicated via DCI, may be used to configure specific slot formats for a device in a serving cell. For example, a cell (e.g., any or all of Cell0, Cell1, and Cell2 of the examples of FIGS. 5 and 6) serving a UE may provide SFI information to the UE with respect to scheduled frequency resources for one or more cells (e.g., the serving cell and/or one or more scheduled cells). In the specific example shown in FIG. 7, a scheduling or serving cell (e.g., Cell0) may carry scheduling information in a control channel (e.g., PDCCH) of a slot for scheduling communication with respect to uplink and/or downlink channels (e.g., PDSCH, PUSCH, etc.) of one or more subsequent slots for a plurality of cells (e.g., Cell0 and Cell1).

5G NR supports configuration of UEs for use of slot format indicators. For example, a radio resource control (RRC) configuration technique may be utilized for providing a semi-static SFI configuration (e.g., DCI SFI payload size, SFI location in the DCI, SFI periodicity, etc.) for facilitating communication of SFI information.

SFI information provided according to any particular SFI configuration may indicate one or more slot formats to be used with respect to a particular cell. For example, DCI may be utilized for a base station dynamically indicating to a UE which slot format(s) to utilize with respect to a particular cell.

A slot format configuration may contain a combination of multiple slot formats (e.g., sequence of slot formats) per cell. Slot format sequences currently supported by 5G NR for normal cyclic prefix are shown in the slot format table below, wherein D indicates a downlink slot format, U indicates an uplink slot format, and F indicates a flexible slot format. In the slot format table shown below, the rows represent available slot format sequences (e.g., indexed by format index numbers 0-255) and the columns represent the slot format for symbols in the slot (e.g., symbols 0-13).

Slot Format Table

| Slot Format Index | Symbol Number In A Slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | F | F | F | F | F |
| 7 | D | D | D | D | D | D | D | D | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |

-continued

Slot Format Table

| Slot Format Index | \multicolumn{14}{c}{Symbol Number In A Slot} |
|---|---|

| Slot Format Index | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | U | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | \multicolumn{14}{c}{Reserved} |
| 255 | \multicolumn{14}{l}{UE determines the slot format for the slot based on tdd-UL-DL-ConfigurationCommon, or tdd-UL-DL-ConfigurationDedicated and, if any, on detected DCI formats} |

SFI information may indicate a particular slot format to implement with respect to a cell by referencing a slot format index of the table above. For example, SFI information comprising a selected one of format index numbers 0-255 may be carried in DCI provided by a base station to a UE for indicating a slot format to be used with respect to a cell. If a 5G NR UE is configured by higher layers (e.g., RRC, DCI, etc.) with a slot format indicator parameter (e.g., SlotFormatIndicator), the UE may be provided with a SFI radio network temporary identifier (RNTI) (e.g., sfi-RNTI) and a payload size of DCI format (e.g., size of DCI format 2_0 by dci-PayloadSize) useful in extracting SFI information from DCI.

Figure 8:
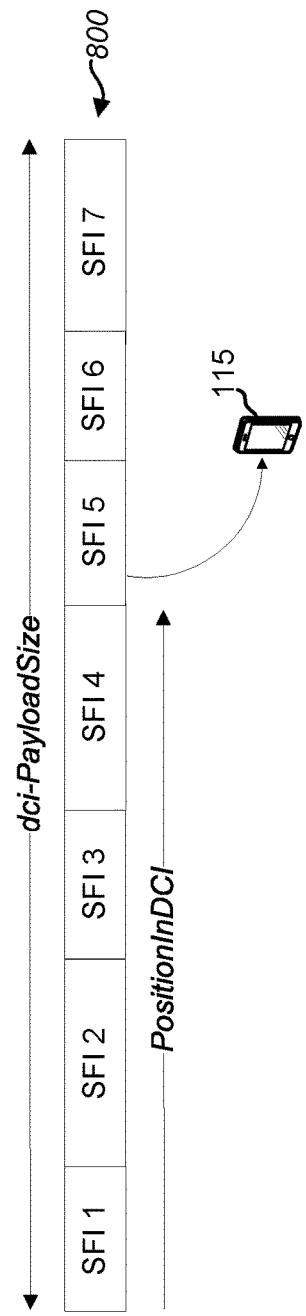
FIG. 8 is a block diagram illustrating an example of a UE extract particular slot format indication (SFI) information from a downlink channel according to one or more aspects.

A slot format configuration may contain multiple slot format combinations per cell (e.g., multiple slot formats indicated by slotFormatCombinations referencing multiple ones of format index numbers 0-255). For each serving cell in the set of serving cells, the UE may be provided an identity of the serving cell (e.g., by servingCellId), a location of a SFI-index field in the DCI format 2_0 (e.g., in DCI format 2_0 by PositionInDCI), and a set of slot format combinations (e.g., by slotFormatCombinations). For example, as shown in FIG. 8, a UE may use information regarding SFI-index field location (e.g., PositionInDCI) to extract particular SFI information (e.g., SFI 5) from DCI, wherein the SFI information may comprise information regarding a set of slot formats (e.g., an index value corresponding to multiple slot format index numbers provided by slotFormatCombinations carried in the SFI information). A SFI-index field value in a DCI format 2_0 may indicate to a UE a slot format for each slot in a number of slots for each downlink BWP or each uplink BWP starting from a slot where the UE detects the DCI format 2_0, wherein the number of slots may be equal to or larger than a PDCCH monitoring periodicity for DCI format 2_0.

As shown in the slot format combinations table below, each slot format combination in the set of slot format combinations may include a plurality of slot formats (e.g., indicated by a respective slotFormats for the slot format combination). For example, a slot format combination index (e.g., provided by slotFormatCombinationId by a SFI-index field value in DCI format 2_0) carried by SFI information may provide information with respect to a slot format mapping for the slot format combination (e.g., provided by slotFormats corresponding to slot format indices of the slot format table). Continuing with the example of FIG. 8, the SFI information of SFI 5 extracted from the DCI by the UE may comprise SlotFormatCombinationID=3 (e.g., corresponding to the slot format combinations table below), whereby the slot format combination of slot formats 0, 46, and 1 (e.g., corresponding to the slot format table above) are indicated to the UE as the slot format combination to be implemented with respect to a corresponding cell (e.g., the scheduling cell).

| Slot Format Combinations Table | |
|---|---|
| SlotFormatCombinationID | slotFormats |
| 0 | {0, 42, 1} |
| 1 | {32, 1, 1} |
| 2 | {0, 0, 42} |
| 3 | {0, 46, 1} |

5G NR supports unpaired spectrum operation with a second uplink carrier for a UE on a serving cell. To facilitate the use of the second uplink carrier, the SFI information (e.g., DCI format 2_0) indicates a combination of slot formats that includes a combination of slot formats for a reference first uplink and a combination of slot formats for a reference second uplink. Where $\mu\_SFI$ is a SCS reference value for the first uplink carrier (e.g., first carrier SFI reference SCS value) and $\mu\_(SFI,SUL)$ is a SCS reference value for the second uplink carrier (e.g., second carrier SFI reference SCS value), for each $2^{((\mu\_SFI-\mu\_(SFI,SUL)))+1}$ values of slot formats (e.g., slotFormats) of a slot format combination, the first $2^{((\mu\_SFI-\mu\_(SFI,SUL)))}$ values for the combination of slot formats are applicable to the reference first uplink carrier and the next value is applicable to the reference second uplink carrier. For example, for $\mu\_SFI-\mu\_(SFI,SUL)=1$, in a slot format combination providing a sequence of six slot formats (e.g., {x0,x1,x2,x3,x4,x5}), the indices of the first 2 slot format index positions (e.g., the first $2^1$ slot format index positions, shown as x0 and x1 denoted in bold in the slot format combination example) are applicable to first uplink and the index of the next slot format index position (e.g., the third slot format index position, shown as x2 not denoted in bold in the slot format combination example) is applicable to second uplink. This pattern is repeated such that the indices of the fourth and fifth slot format index positions (e.g., the slot format index positions, shown as x3 and x4 denoted in bold in the slot format combination example) are applicable to first uplink and the index of the next slot format index position (e.g., the sixth slot format index position, shown as x5 not denoted in bold in the slot format combination example) is applicable to second uplink.

Figure 9:
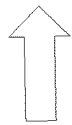
FIG. 9 is a block diagram illustrating an example of switching between slot format types according to slot format indications according to one or more aspects.

In operation according to an existing 5G NR protocol, a base station configures a UE with DCI position information (e.g., DCI_position) for each cell when enabling intra-band cross-cell full duplex operation with respect to those cells. A symbol is indicated to a UE as flexible by tdd-UL-DL-ConfigurationCommon and tdd-UL-DL-ConfigurationDedicated, if provided, or when tdd-UL-DL-ConfigurationCommon and tdd-UL-DL-ConfigurationDedicated are not provided to the UE. If the UE detects a DCI format 2_0 providing a format for the slot using a slot format value other than 255, the symbol is switched. An example according to the foregoing operation is shown in FIG. 9, wherein flexible ("F") slots (format 2) are switched to downlink ("D") slots (format 0) or uplink ("U") slots (format 1) according to the slot formats shown for each cell in the table below.

| Cell | DCI_position | ID | slotFormats |
|---|---|---|---|
| 0 | DCI_position1 | 0 | {0, 0, 0, 1} |
| 1 | DCI_position2 | 1 | {0, 1, 0, 0} |
| 2 | DCI_position3 | 2 | {0, 1, 0, 1} |

For dynamic full duplex operation at a base station using different cells, the base station sends SFI information to the UE to indicate slot types. SFI payload utilized according to this operation may be determined according to the following: The SFI-index field includes ceil(log 2(maxSFindex+ 1)) bits, where maxSFindex is the maximum value of the values provided by corresponding slotFormatCombinationId (e.g., the maximum slotFormatCombinationId=511). The aggregate SFI overhead may be determined from the number of cells and the SFI bitwidth per cell (e.g., Aggregate SFI overhead=num_cells*SFI_bitwidth_per_cell). Thus, it can be seen that the SFI payload scales with the number of cells. In cross-cell full duplex implementations, for example, SFI payloads scale with the number of cells used for full duplex operation.

SFI information provided according to aspects of the present disclosure indicates slot formats across time and cells with reduced overhead as compared to existing SFI protocols. For example, cell-group SFI information facilitating dynamic cross-cell operation provided according to some aspects of the disclosure provide for SFI payloads which do not scale with the number of cells. The reduced overhead provided through use of cell-group SFI information of some examples may be particularly useful with respect to communications implemented using the FR2 operating band, where a base station may typically configure UEs will multiple cells (e.g., UE configured with 4× 100 Mhz cells).

In operation according to aspects of the present disclosure, UEs 115 of wireless network 100 may be provided with information regarding cell-groups supporting full duplex communication and information regarding cell slot formats (e.g., one or more slot format tables) for cells in the cell-groups. For example, one or more of base stations 105 may define the cells in cell-groups and an order of cells in each group (e.g., by cell identification information, by cell frequency band, etc., suitable for determining an order of cells with respect to cell-group SFI information). A base station may provide such information regarding cell-groups and corresponding order of cells to one or more of UEs 115 via a RRC configuration cell-group definition.

Cells may be grouped according to various aspects, attributes, etc. in providing cell-groups utilized according to aspects of the disclosure. For example, cells may be grouped according to cells having the same SFI reference SCS (e.g., cells with a same $\mu\_SFI$ value), cells having a SFI reference SCS differing by or within a threshold magnitude (e.g., cells with $\mu\_SFI$ values that differ by a maximum threshold value, such as 1), cells having a same SFI information monitoring periodicity (e.g., cells with a same DCI format 2_0 SFI monitoring periodicity), cells belonging to a same operating frequency band (e.g., FR1 or FR2 cells available for intra-band carrier aggregation (CA)), etc., and combinations thereof. According to some examples, the cell groupings need not be disjoint (e.g., a same cell may be included in more than one cell-group).

In addition to the above described cell-group information and information regarding an order of cells of the cell-groups, UEs 115 may be provided with one or more cells slot format combination tables. A cells slot format combination table may, for example, provide slot formats (e.g., one or more cell slot format sequences) for all cells in one or more cell-groups. One or more of base stations 105 may configure UEs via RRC with a cells slot format combination table for each cell-group according to some aspects of the disclosure.

In operation according to aspects herein, a base station may send cell-group SFI information to a UE indicating slot formats for cells in a cell-group. For example, a base station may send DCI carrying cell-group SFI information to indicate slot formats for all cells in a cell-group to the UE. Cell-group SFI information provided according to aspects of the disclosure may, for example, indicate cell slot formats for a selected cell-group to provide the UE with slot formats used with respect to cells of the selected cell-group.

In operation according to some examples, the cell-group SFI information may be indicated as SFI pertaining to a cell-group based at least in part on a RNTI associated with the selected cell-group. For example, a DCI format (e.g., DCI_2_x) may be defined for use with respect to cell-groups, wherein the DCI format uses cell-group RNTI (e.g., cells-sfi-RNTI) useful to indicate the SFI as corresponding to a particular cell-group.

The cell-group SFI information of some examples may be indicated as SFI pertaining to a cell-group using an existing DCI format (e.g., DCI_2.0). For example, a UE may interpret SFI information (e.g., slotFormatCombinationId) to differentiate between legacy SFI (e.g., per-cell SFI) and cell-group SFI based at least in part on an associated search space (SS) and/or control resource set (CORESET) associated with the DCI (e.g., a base station may define a mapping between SS and/or CORESET and cell-groups), a scheduling cell of the selected cell-group (e.g., each cell-group has a different scheduling cell, such as with a one-to-one mapping between cell-groups and scheduling cells), or a combination thereof associated with the selected cell-group.

According to some aspects of the disclosure, cell-group SFI information may be utilized to indicate (e.g., by one or more of base stations 105) and/or determine (e.g., by one or more of UEs 115) slot formats with respect to a number of slots which is equal to or larger than a PDCCH monitoring periodicity for SFI. In an example, cells in each cell group may have, or be assumed to have, a same SFI monitoring periodicity, wherein cell-group SFI information may provide slot format indications with respect to a number of cell slots which is equal to or larger than this SFI monitoring periodicity. In another example, cell-group SFI information may provide slot format indications with respect to a number of cell slots which is equal to or larger than a largest SFI monitoring periodicity among cells in the cell-group (e.g. SFI information indicates X cell slots, wherein X≥a largest SFI monitoring periodicity among cells in the cell-group).

Various techniques may be implemented for configuring cell-group SFI according to aspects of the disclosure. Some examples provide for semi-static configurations (e.g., provided by a base station 105 to one or more UEs 115) to indicate SFI RRC configuration (DCI_position, SFI reference SCS, etc.) for cell-group SFI. In accordance with aspects of the disclosure, the SFI configuration information may be associated with a scheduling cell of the cell-group and may be configured for use in both decoding the cell-group SFI information and for decoding per-cell SFI information (e.g., cell-group SFI configuration may reuse a per-cell SFI configuration). For example, a UE may be configured with per-cell SFI configuration according to DCI format 2_0. For cell-group SFI, the UE may only use the SFI configuration of the scheduling cell (e.g., the cell where the UE decodes DCI carrying cell-group SFI). In this example, different cell-groups may have different scheduling cells. According to further aspects of the disclosure, the SFI configuration information may be unique to the cell-group SFI (e.g., a new cell-group SFI configuration may be defined). For example, UEs may be configured with one or more separate SFI configurations (e.g., using Cell-group_DCI_position) dedicated to each cell-group. In some examples, a dedicated scheduling cell in each cell-group may be utilized for monitoring cell-group SFI.

In operation according to some examples, a UE may receive per-cell SFI information indicating a slot format for a same cell slot as indicated by a cells slot format indicated by cell-group SFI information. According to some aspects of the disclosure, UEs may expect both per-cell SFI and cell-group SFI to indicate same cell slot formats. A base station may be configured to provide same cell slot formats with respect to per-cell SFI information indicating a slot format for a same cell slot as indicated by the cells slot format indicated by cell-group SFI information. In some examples, a per-cell SFI or cell-group SFI may be given priority. UEs may be configured, such as using cell-group SFI configuration information provided by a base station, to prioritize either per-cell SFI or cell-group SFI in a case where per-cell SFI information indicates a slot format for a same cell slot as indicated by the cells slot format indicated by cell-group SFI information. In operation according to some examples, a UE may apply a priority metric to overwrite the slot format provided by one of the per-cell SFI information or the cell-group SFI information with the slot format provided by the other one of the per-cell SFI information or the cell-group SFI information.

Figures 10, 11:
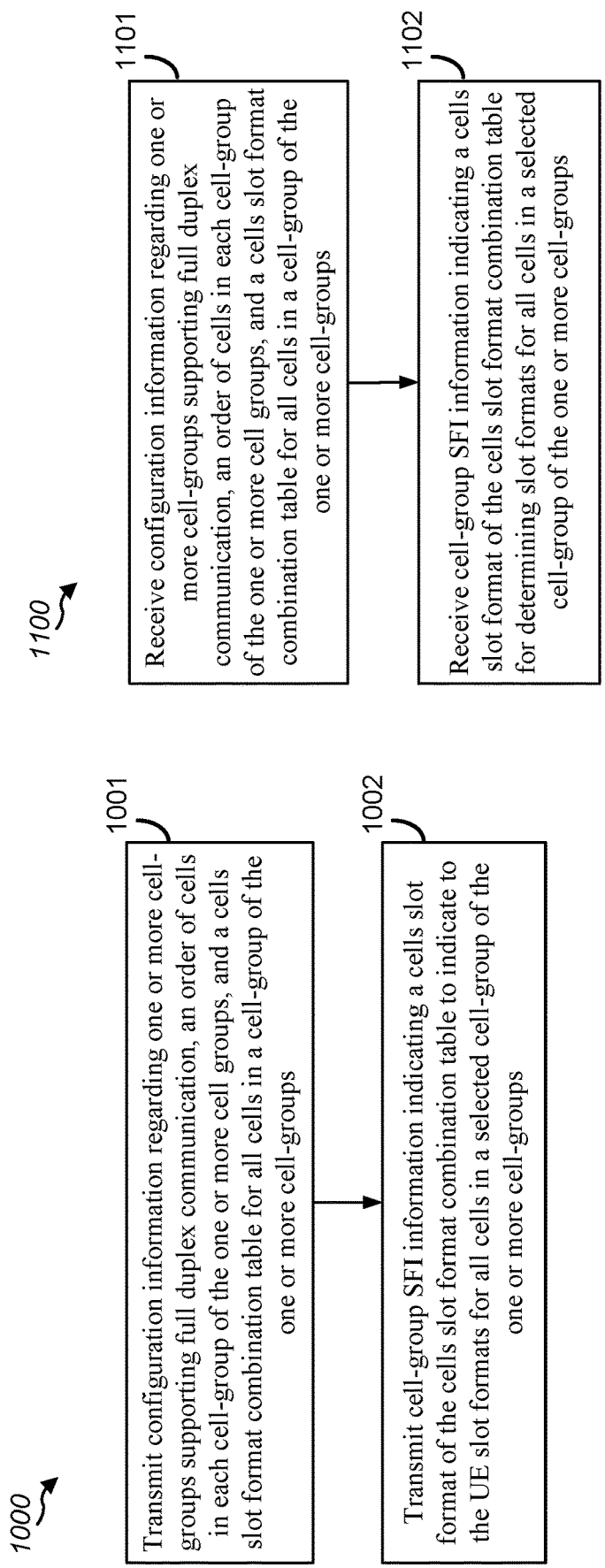
FIG. 10 is a flow diagram illustrating an example process implemented by a base station that supports cell-group SFI for dynamic cross-cell operation according to one or more aspects.
FIG. 11 is a flow diagram illustrating an example process implemented by a UE that supports cell-group SFI for dynamic cross-cell operation according to one or more aspects.

FIGS. 10 and 11 are flow diagrams illustrating an example of a cell-group SFI procedure for dynamic cross-cell operation, such as may support full duplex operation. In particular, FIG. 10 is a flow diagram illustrating example process 1000 that supports cell-group SFI for dynamic cross-cell operation as may be implemented by one or more base stations according to one or more aspects of the disclosure. Operations of process 1000 may be performed by an instance of base station 105 described above with reference to FIGS. 1 and 2 and/or a base station described below with reference to FIG. 20. FIG. 11 is a flow diagram illustrating example process 1100 that supports cell-group SFI for dynamic cross-cell operation as may be implemented by one or more UEs according to one or more aspects of the disclosure. Operations of process 1100 may be performed by an instance of UE 115 described above with reference to FIGS. 1 and 2 and/or a UE described below with reference to FIG. 19. The example operations (also referred to as "blocks") of processes 1000 and 1100 may enable base stations 105 and UEs 115 to support full duplex operation using a cell-group SFI procedure for dynamic cross-cell operation according to aspects of the disclosure.

Referring first to FIG. 10, at block 1001 of the example of process 1000 one or more base stations may transmit configuration information regarding one or more cell-groups supporting full duplex communication, an order of cells in each cell-group of the one or more cell groups, and a cells slot format combination table for all cells in a cell-group of the one or more cell-groups. For example, cell-group SFI logic (e.g., program code stored by memory 242 and executed by a processor of control 240) of a base station 105 may define one or more cell-groups and an order of cells in each group. Further, a base station 105 may store (e.g., in memory 242) one or more cells slot format combination tables (e.g., cells slots format combination tables, cells slot formats tables, etc.) providing information regarding slot formats for all cells in one or more cell-groups (e.g., determined by cell-group SFI logic of a base station, preconfigured, such as by a network operator, etc.) for use with respect to aspects of cell-group SFI operation described herein. The one or more base stations may transmit (e.g., using transmit processor 220, TX MIMO processor 230, MODs 232a-232t, and antennas 234a-234t under control of controller 240) the above information to one or more of UEs 115 for configuring the UEs for cell-group SFI according to aspects of the present disclosure.

In operation according to some examples, the one or more base stations may utilize information regarding UE support for one or more features with respect to cross-cell operation using cell-groups for facilitating configuring the UEs. Accordingly, a base station may receive (e.g., prior to determining and/or transmitting the above cell-group SFI configuration information) information from one or more UEs regarding support for one or more features utilized with respect to cross-cell operation using the one or more cell-groups. The information received from the one or more UEs may, for example, include information regarding UE support for a DCI format for cross-cells SFI, RRC configuration of cells slot format combination tables, RRC SFI configuration for cross-cell SFI, cell-group support for cells having different SFI reference SCS values, indirect cells slot format support using cells slot format combination tables, direct cells slot format support using cells slot format combination tables, repetition support for cell-groups including cells having different SFI reference SCS values, subsampling support for cell-groups including cells having different SFI reference SCS values, and/or interlacing support for cell-groups including cells having different SFI reference SCS values.

Referring now to FIG. 11, at block 1101 of the example of process 1100 a UE may receive configuration information regarding one or more cell-groups supporting full duplex communication, an order of cells in each cell-group of the one or more cell groups, and a cells slot format combination table for all cells in a cell-group of the one or more cell-groups. For example, a UE 115 may receive (e.g., using antennas 252a-252r, DEMODs 254a-254r, MIMO detector 256, and receive processor 258 operating under control of controller 280) the above information from one or more base stations 105. Further, the UE may store (e.g., in memory 282) some or all of the received information for use with respect to aspects of cell-group SFI operation described herein. For example, cell-group SFI logic (e.g., program code stored by memory 282 and executed by a processor of control 280) of a UE 115 may use some or all of the information to configure the UE for operation according to aspects of a cell-group SFI procedure.

In operation according to some examples, the UE may provide information regarding support for one or more features with respect to cross-cell operation using cell-groups for facilitating one or more base stations configuring the UE for cell-group SFI operation. Accordingly, a UE may transmit (e.g., prior to receiving the above cell-group SFI configuration information) information to one or more base station regarding UE support for one or more features utilized with respect to cross-cell operation using the one or more cell-groups. The information transmitted to the one or more base stations may, for example, include information regarding UE support for a DCI format for cross-cells SFI, RRC configuration of cells slot format combination tables, RRC SFI configuration for cross-cell SFI, cell-group support for cells having different SFI reference SCS values, indirect cells slot format support using cells slot format combination tables, direct cells slot format support using cells slot format combination tables, repetition support for cell-groups including cells having different SFI reference SCS values, sub sampling support for cell-groups including cells having different SFI reference SCS values, and/or interlacing support for cell-groups including cells having different SFI reference SCS values.

Referring again to FIG. 10, at block 1002 of process 1000 the one or more base stations transmit cell-group SFI information indicating a cells slot format of the cells slot format combination table to indicate to the UE slot formats for all cells in a selected cell-group of the one or more cell-groups. For example, one or more base stations 105 may transmit (e.g., using transmit processor 220, TX MIMO processor 230, MODs 232a-232t, and antennas 234a-234t under control of controller 240) the SFI information to one or more of UEs 115 facilitating determining slot formats for cells in a selected cell-group by the one or more UEs. The cell-group SFI information may, for example, be carried via DCI transmitted by a base station. According to some examples, the cell-group SFI information may be indicated as SFI pertaining to a cell-group based at least in part on a RNTI associated with the selected cell-group. Additionally or alternatively, the cell-group SFI information may be indicated as SFI pertaining to a cell-group based at least in part on an associated SS, CORESET, a scheduling cell of the selected cell-group, or a combination thereof associated with the selected cell-group.

In operation according to aspects of the disclosure, cell-group SFI logic of a base station may select slot formats (e.g., a particular combination of slot formats) for the cell group to indicate in the cell-group SFI information based one various aspects. For example, according to some aspects of the disclosure, a combination of slot formats for a cell-group to be implemented by one or more UEs communicating with the base station may be selected based at least in part on one or more aspects such as uplink and/or downlink traffic, base station and/or UE transmission queue status, channel characteristics, quality of service requirements, UE capabilities, etc.

The cells slot format of the cell-group SFI information may provide slot formats for a number of cell slots (e.g., a number of slots for a period of time). According to some examples, the number of cell slots may be greater than or equal to a SFI monitoring periodicity where the cells in the selected cell-group use the SFI monitoring periodicity (e.g., the number of cell slots is sufficient to cover a period of time of the SFI monitoring periodicity utilized by all cells of the cell group). Additionally or alternatively, the number of cell slots may be greater than or equal to a largest SFI monitoring periodicity of a plurality of SFI monitoring periodicities where two or more cells in the selected cell-group have different SFI monitoring periodicity (e.g., the number of cell slots is sufficient to cover a period of time of the SFI monitoring periodicity of the cell having the largest SFI monitoring periodicity).

Referring once again to FIG. 11, at block 1102 of process 1100 the UE receives cell-group SFI information indicating a cells slot format of the cells slot format combination table for determining slot formats for all cells in a selected cell-group of the one or more cell-groups. For example, UE 115 may receive (e.g., using antennas 252a-252r, DEMODs 254a-254r, MIMO detector 256, and receive processor 258 operating under control of controller 280) the SFI information from a base station of one or more base stations 105 facilitating determining (e.g., through operation of cell-group SFI logic of the UE) slot formats for cells in a selected cell-group by the UE. The cell-group SFI information may, for example, be carried via DCI received from a base station of the one or more base stations. According to some examples, the cell-group SFI information may be determined by the UE to be SFI pertaining to a cell-group based at least in part on a RNTI associated with the selected cell-group. Additionally or alternatively, the cell-group SFI information may be determined by the UE to be SFI pertaining to a cell-group based at least in part on an associated SS, CORESET, a scheduling cell of the selected cell-group, or a combination thereof associated with the selected cell-group.

Cell-group SFI procedures, such as shown by the examples of FIGS. 10 and 11 described above, implemented according to some aspects of the disclosure operation provide for one or more base stations defining cell-groups and order of cells in each group, and configuring UEs with a cells slot format combination table for one or more cell-groups. UEs may, for example, be RRC configured with a cells slot format combination table (e.g., CellSlotFormatCombination table) for each cell group. In accordance with some examples, a cells slot format combination table maps a combination identifier (e.g., cell-group slot format combination index) to a combination of slot formats (e.g., slotFormats) for all cells in a cell-group and for a number of slots. To facilitate UEs obtaining cell-group SFI information, UEs may be configured with various cell-group SFI configuration information (e.g., a DCI_position for monitoring cell-group SFI). A base station may send DCI carrying cell-group SFI information and a UE may decode cell-group SFI payload based on one or more aspects of the cell-group SFI configuration information (e.g., DCI_position). The cell-group SFI information obtained by the UE from the DCI may indicate a combination identifier (e.g., cell-group slot format combination index) in the cells slot format combination table (e.g., CellSlotFormatCombination table), thus indicating a corresponding combination of slot formats (e.g., slotFormats) for all cells in a cell-group. Base stations 105 and UEs 115 of wireless network 100 may, for example, utilize cell-group SFI information of some examples to support full duplex operation implemented using cross-cell communication techniques.

Cells slot format combination tables utilized according to aspects of the disclosure may be implemented in accordance with various techniques. For example, a cells slot format combination table may utilize a direct technique, wherein one or more fields of the cells slot format combination table explicitly define a sequence of slot formats across cells and time. In another example, a cells slot format combination table may utilize an indirect technique, wherein one or more fields of the cells slot format combination table defines a sequence of indices in time, where each index maps to a pattern of slot formats across cells.

An example cells slot format combination table implementing a direct technique to directly provide a time sequence of slot formats for all cells of the selected cell-group is shown in the table below. In the example cells slot format combination table implementing a direct technique, each slot format combination includes a sequence of slot formats (e.g., CellsSlotFormat) for all cells and multiple slots indexed by combination identification information (e.g., CellsSlotFormatCombinationID). It should be understood that only the slot format combination for CellsSlotFormatCombinationID=1 is expressly shown below, whereas the slot format combinations for CellsSlotFormatCombinationID=0, 2, and 3 are represented generally by an ellipsis. A cells slot format may, for example, comprise a plurality of blocks of at least size N, wherein size N is equivalent to a number of cells in the selected cell-group, and wherein each block of the plurality of blocks provides slot format information for each cell of the selected cell-group for a portion of time of the time sequence. In the illustrated example, the sequence of slot formats of a slot format combination comprises blocks of size N, where N is number of cells in the cell-group.

Figure 12:
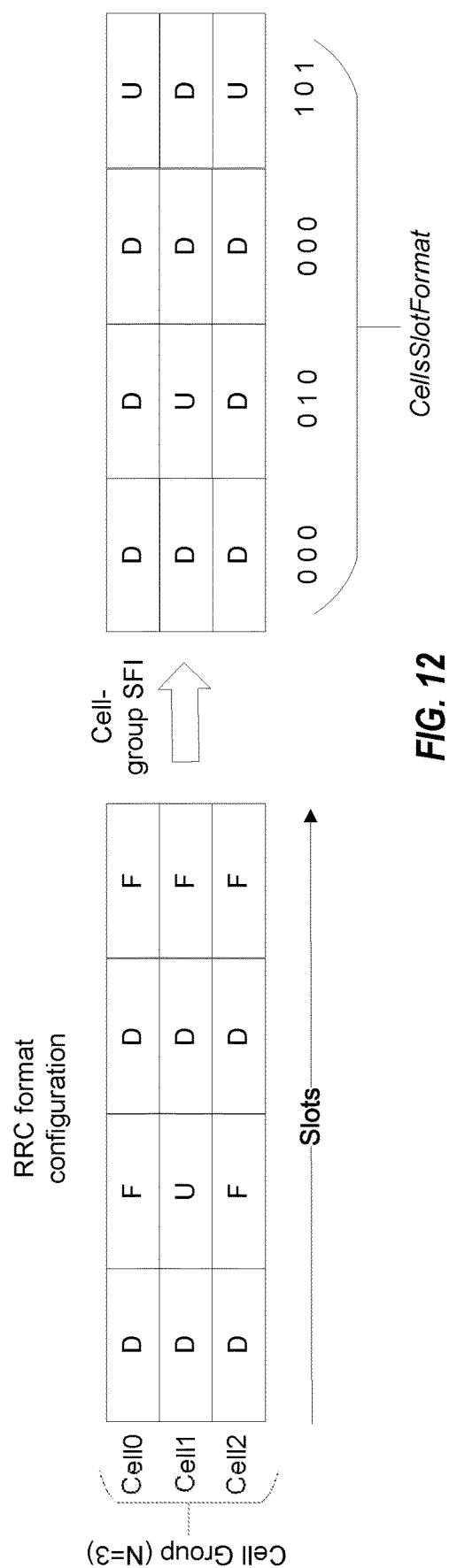
FIGS. 12 and 13 are block diagrams illustrating examples of cells slot formats indicated by cell-group SFI information according to one or more aspects.

As shown in FIG. 12, each block of a cells slot format indicated by cell-group SFI information comprising CellsSlotFormatCombinationID=1 may define cell-group slot formats at a certain time slot. For example, for a cell-group with three cells (e.g., N=3), the slot format combination {x0 x1 x2; x3 x4 x5; ... }, the slot formats at positions x0, x1, and x2 define a cell-group slot format for Cell0, Cell1, and Cell2 at a first time slot (e.g., T) and the slot formats at positions x3, x4, and x5 define a cell-group slot format for Cell0, Cell1, and Cell2 at a second time slot (e.g., T+1), wherein Cell0 slot formats are in positions x0 and x3, Cell1 slot formats are in positions x1 and x4, and Cell2 slot formats are in positions x2 and x5.

| Cells Slot Format Combination TableDirect | |
|---|---|
| CellsSlotFormatCombinationID | CellsSlotFormat |
| 0 | {...} |
| 1 | {000; 010; 000; 101} |
| 2 | {...} |
| 3 | {...} |

An example cells slot format combination table implementing an indirect technique to provide a time sequence of indices, wherein each index of the sequence of indices maps to a pattern of slot formats for the cells of the selected cell-group, is shown in the table below. In the example cells slot format combination table implementing an indirect technique, the indices of the cells slot format (e.g., CellsSlotFormatIndex) correspond to a cells slot formats table comprising slot format information for each cell of the selected cell-group. It should be understood that only the slot format indices for CellsSlotFormatCombinationID=1 are expressly shown below, whereas the slot format indices for CellsSlotFormatCombinationID=0, 2, and 3 are represented generally by an ellipsis. An example cells slot formats table corresponding to the cells slot format combination table is also shown below. The example cells slot formats table provides cells slot formats (e.g., CellsSlotFormats) corresponding to cells slot format indices (e.g., CellsSlotFormatIndex), wherein each cells slot format provides slot format information for each cell of a cell-group for a portion of time (e.g., one or more time slots). A base station may, for example, configure (e.g., using RRC configuration) a UE with a plurality of tables (e.g., one or more cells slot format combination tables and one or more corresponding cells slot formats tables), wherein cells slot format indices of one table (e.g., a cells slot format combination table) correspond to cells slot format configurations of a corresponding table (e.g., a cells slot formats table). The cells slot format configurations may provide slot formats across the cells of a cell group.

Figure 13:
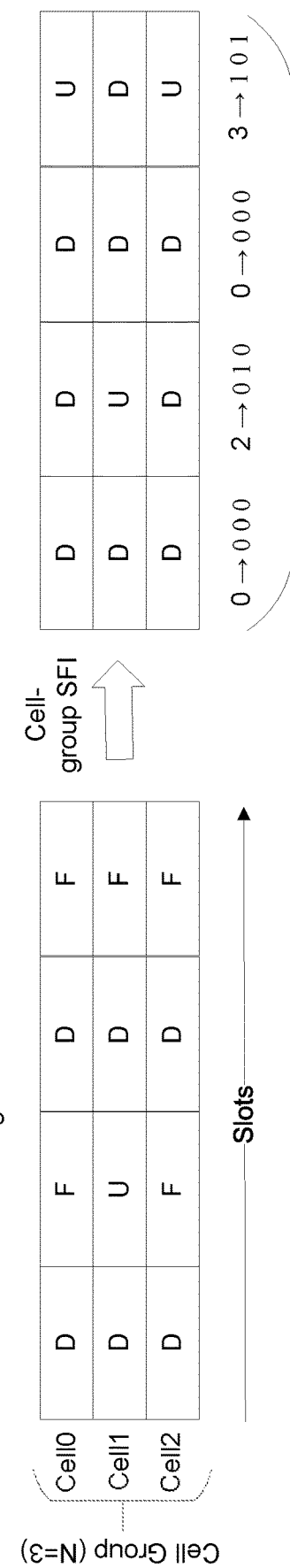

As shown in FIG. 13, each cells slot format index indicated by cell-group SFI information comprising CellsSlotFormatCombinationID=1 may identify a block of slot formats defining a cell-group slot format at a certain time slot. For example, the cells slot format index combination {y0 y1 y2 y3 ... }, the cell slot format index at position y0 indicates a slot format for each cell of a cell-group at a first time slot (e.g., T), the cell slot format index at position y1 indicates a slot format for each cell of the cell-group at a second time slot (e.g., T+1), the cell slot format index at position y2 indicates a slot format for each cell of the cell-group at a third time slot (e.g., T+2), and the cell slot format index at position y3 indicates a slot format for each cell of the cell-group at a fourth time slot (e.g., T+3). For a cell-group with three cells (e.g., N=3), each slot format indicated by a cells slot format index may comprise slot format combination of at least size N. The example of FIG. 13 provides for the slot format combination {x0 x1 x2} defining a cell-group slot format for Cell0, Cell1, and Cell2, wherein the slot format at position x0, corresponds to Cell0, the slot format at position x1 corresponds to Cell1, and the slot format at position x2 corresponds to Cell2.

In accordance with some examples of a cells slot format combination table implementing an indirect technique, the number of combinations across cells may be fewer than the number of combinations across slots, such as to reduce the amount of overhead used in dynamically indicating to UEs which slot formats to utilize with respect to cell groups. For example, DCI carrying cell format index information may be minimized by reducing the number of combinations across cells, whereas the cells slot formats of a cells slot formats table configured by RRC may be relatively large.

| Cells Slot Format Combination Table Indirect | |
|---|---|
| CellsSlotFormatCombinationID | CellsSlotFormatIndex |
| 0 | {. . .} |
| 1 | {0, 2, 0, 3} |
| 2 | {. . .} |
| 3 | {. . .} |

| Cells Slot Formats Table | | | |
|---|---|---|---|
| | CellsSlotFormats | | |
| CellsSlotFormatIndex | Cell 0 | Cell 1 | Cell 2 |
| 0 | 0 | 0 | 0 |
| 1 | 1 | 1 | 1 |
| 2 | 0 | 1 | 0 |
| 3 | 1 | 0 | 1 |

It should be understood that the foregoing examples are simplified in order to aid in understanding concepts of the present disclosure. The various tables and the information therein may be more robust and complex than that of the examples, such as for supporting larger numbers of cell groups, cells within any particular cell group, slot format combinations, and/or slots. As an example, cell-group slot formats accommodated according to some aspects of the invention may comprise hundreds or even thousands of slot format sequence combinations. As a further example, the slot formats may include special formats for mixed types of symbols (e.g., uplink symbols and downlink symbols) within a slot.

As shown by the examples above, cells slot format combination tables implementing either a direct technique or an indirect technique according to aspects of the disclosure facilitate indication of slots of different types. According to some aspects of the disclosure, the different types of slots may comprise only downlink (D), uplink (U), and flexible (F) slots (e.g., slot formats 0, 1, and 255 of the slot format table shown above having slot format sequences currently supported by 5G NR). According to further aspects, in addition to or in the alternative to downlink (D), uplink (U), and/or flexible (F) slots, the slots may include D+U slots (e.g., for use in supporting sub-band full duplex operation within a cell). In some examples, one or more reserved slot formats (e.g., slot formats indexed by format index numbers 62-254 of the slot format table shown above) may be used for intra-cell full duplex. Additionally or alternatively, all or a subset of the slot formats providing for different or mixed types of symbols within a slot (e.g., slot formats indexed by format index numbers 3-55 of the slot format table shown above) may be utilized according to aspects of the disclosure.

In accordance with some aspects of the disclosure, cells of a cell group (e.g., cells utilized in providing cross-cell full duplex operation using cell-group SFI according to concepts herein) may implement a same or different SFI reference SCS. A methodology may be applied in which slot formats indicated by cell-group SFI information is applicable to some number of consecutive slots for situations where one or more active uplink and/or downlink BWPs in a cell-group have SCS which is larger than a SFI reference SCS for the cell-group.

As discussed above, SFI configuration for unpaired spectrum in 5G NR includes a SFI reference SCS configuration $\mu\_SFI$ (e.g., given by subcarrierSpacing). If a supplementary uplink carrier is configured for serving cell, a SFI reference SCS configuration $\mu\_(SFI, SUL)$ is given (e.g., given by subcarrierSpacing2). A UE may expect, for an active downlink and/or uplink BWP with a particular SCS (e.g., SCS $\mu$), that the SCS of the active BWP will be greater than or equal to the SFI reference SCS (e.g., $\mu \geq \mu\_SFI$). Each slot format in a slot format combination indicated by DCI 2_0 is applicable to $2^{((\mu - \mu\_SFI))}$ consecutive slots in active downlink and/or uplink BWP, wherein the first slot starts at a same time as a first slot for $\mu\_SFI$ and each downlink, flexible, or uplink symbol for the SFI reference SCS configuration $\mu\_SFI$ corresponds to consecutive downlink, flexible, or uplink symbols for the SCS configuration $\mu$. For example, where a slot format combination={0,0,0,1}, $\mu\_SFI=1$, and $\mu=2$, each slot format in {0,0,0,1} corresponds to two consecutive slots (e.g., providing the sequence of slot formats: D D D D D U U. where "D" indicates a downlink slot and "U" indicates an uplink slot). The foregoing also applies to second reference $\mu\_(SFI,SUL)$ and the active uplink SCS $\mu\_SUL$.

In accordance with some aspects of the disclosure, a cells slot format combination table implementing a direct technique may be configured to support one or more active uplink and/or downlink BWPs in a cell-group having SCS which is larger than a SFI reference SCS for the cell-group. The sequence of slot formats (e.g., CellsSlotFormat) for a cells slot format combination (e.g., corresponding to a particular CellSlotFormatCombinationID) may, for example, be configured to account for different SFI reference SCS of each cell of a cell group. For example, the slot format sequences of cell-group SFI information may comprise a plurality of blocks, where each block defines cells slot formats at a certain slot. The blocks may be of at least size N, where size N is equivalent to a number of cells in the cell-group. According to aspects of the disclosure, each block of the plurality of blocks may provide slot format information for each cell of the cell-group for a portion of time of a time sequence. Where two or more cells of a cell-group have a different SFI reference SCS, each block of the plurality of blocks may comprise a plurality of sequences of different lengths, wherein each sequence of the plurality of sequences corresponds to a respective cell of the cell-group and has a sequence length corresponding to the SFI reference SCS of the respective cell. For example, each block may be defined as {seq_1st_cell, seq_2nd_cell, . . . } (the cell order in the cell-group may, for example, be RRC configured), where the length of seq_x_cell may correspond to the SFI reference SCS of the respective cell.

FIG. 14 shows a specific example implementing a plurality of blocks comprising a plurality of sequences of different lengths where Cell0 is the scheduling cell in a cell-group comprising Cell0, Cell1, and Cell2, and the SFI reference SCS of Cell1 (e.g., μ_SFI=2) is greater than the SFI reference SCS of Cell2 (e.g., μ_SFI=1) which is greater than the SFI reference SCS of Cell0 (e.g., μ_SFI=0). The cells slot format (e.g., CellsSlotFormat) identified by cell-group SFI information (e.g., CellsSlotFormatCombinationID) may provide the combination {0 0101 00; 1 0000 11; 1 1010 00; 1 1111 11} (e.g., four blocks of slot format sequences are provided in which a first block includes the slot format sequences 0, 0101, and 00, wherein the first slot format sequence corresponds to Cell0, the second slot format sequence corresponds to Cell1, and the third slot format sequence corresponds to Cell2).

A cells slot format combination table and/or cells slot formats table of an indirect technique implementation may additionally or alternatively be configured to support one or more active uplink and/or downlink BWPs in a cell-group having SCS which is larger than a SFI reference SCS for the cell-group according to aspects of the disclosure. Various methodologies for accommodating two or more cells of a cell-group having different SFI reference SCS, such as may comprise repetition, subsampling, interlacing, etc., may be utilized according to aspects herein.

In accordance with some examples of a repetition methodology used with respect to a cells slot format combination table implementing an indirect technique, the lowest SFI reference SCS in a cell-group may be used to determine the length of a cells slot format combination sequence (e.g., CellsSlotFormatIndex). For cells of the cell-group with a SFI reference SCS greater than the lowest SFI reference SCS in the cell-group, the same slot type may be repeated. According to an example implementation of a repetition methodology, a length of sequences of slot format information corresponding to respective cells of a cell-group may be determined from a lowest SFI reference SCS value of the cells of the cell-group and a slot format of the slot format information may be repeated for any cell of the cell-group having a SFI reference SCS value greater than the lowest SFI reference SCS value.

FIG. 15 shows a specific example implementing a repetition methodology where Cell0 is the scheduling cell in a cell-group comprising Cell0, Cell1, and Cell2, and the SFI reference SCS of Cell0 (e.g., μ_SFI=0) is lower than the SFI reference SCS of Cell1 (e.g., μ_SFI=1) which is lower than the SFI reference SCS of Cell2 (e.g., μ_SFI=2). The cells slot format (e.g., CellsSlotFormats) identified by cell-group SFI information (e.g., CellsSlotFormatCombinationID-→CellsSlotFormatIndex→CellsSlotFormats) may be repeated for cells with a SFI reference SCS greater than the scheduling cell SFI reference SCS, The example illustrated in FIG. 15 shows implementation of a repetition methodology according to the foregoing for a cells slot format index combination (e.g., CellsSlotFormatIndex) of {0,2,0,1}, wherein the cells slot format indices of the combination correspond to the cells slot formats table above (e.g., CellsSlotFormatIndex=0→CellsSlotFormats {0 0 0}, CellsSlotFormatIndex=1→CellsSlotFormats {1 1 1}, and CellsSlotFormatIndex=2→CellsSlotFormats {0 1 0}).

In accordance with an alternative to the foregoing repetition methodology used with respect to a cells slot format combination table implementing an indirect technique, in a case in which one or more cells of a cell-group have a higher SFI reference SCS than a SFI reference SCS used to indicate the cells slot format, the cells slot format indicated by the cell-group SFI information may provide a first slot format of a sequence of slot formats for the one or more cells and a remaining number of slot formats of the sequence may be left as having a flexible slot format. For example, if a SFI reference SCS used to determine a cell shot format combination is smaller than the SFI reference SCS of one or more cells of a cell-group, then the SFI information may only indicate first slot out of $2^{(\mu\_cellx - \mu\_Ref)}$ slots and the rest may be left as flexible slots.

Figure 16:
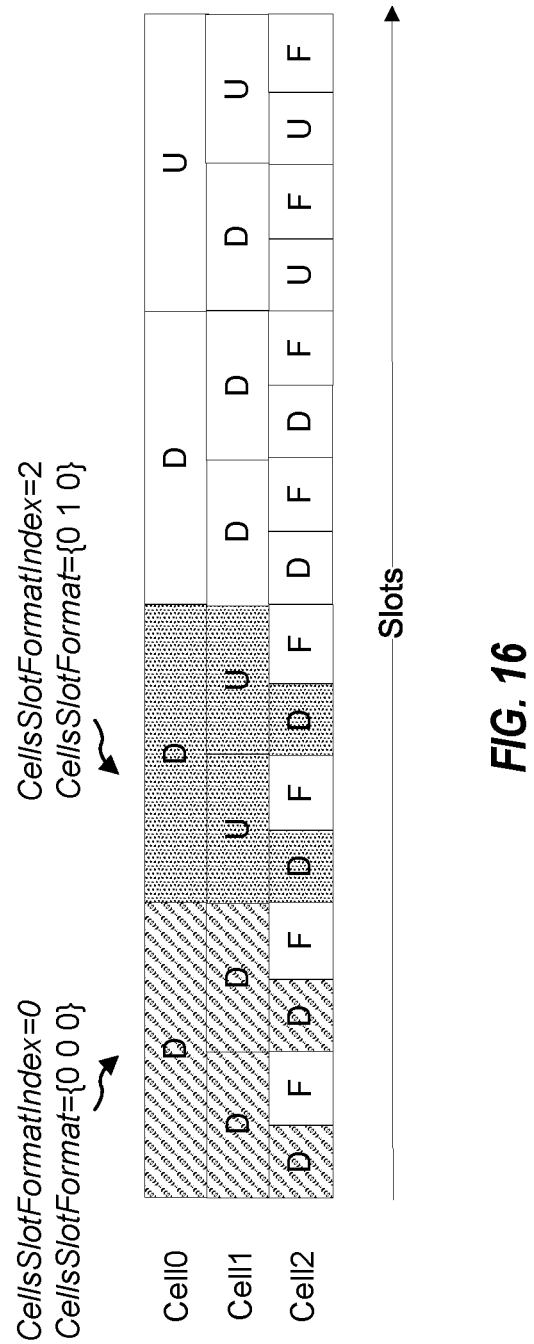
FIG. 16 is a block diagram illustrating an example of cell-group SFI operation implementing an alternative to a repetition methodology according to one or more aspects.

FIG. 16 shows a specific example implementing the above alternative where Cell1 is the scheduling cell in a cell-group comprising Cell0, Cell1, and Cell2, and the SFI reference SCS of Cell0 (e.g., μ_SFI=0) is lower than the SFI reference SCS of Cell1 (e.g., μ_SFI=1) which is lower than the SFI reference SCS of Cell2 (e.g., μ_SFI=2). In particular, the example illustrated in FIG. 16 shows implementation of a methodology according to the foregoing for a cells slot format index combination of {0,0,2,2,0,0,3,1}, wherein the cells slot format indices of the combination correspond to the cells slot formats table above (e.g., CellsSlotFormatIndex=0→CellsSlotFormats {0 0 0}, CellsSlotFormatIndex=1→CellsSlotFormats {1 1 1}, CellsSlotFormatIndex=2→CellsSlotFormats {0 1 0}, and CellsSlotFormatIndex=3→CellsSlotFormats {1 0 1}). In the illustrated example, the cells slot format index, and thus the cell-group slot format, provided with respect to Cell2 is applied only with respect to the first slot out of each two slots (e.g., $2^{(\mu\_cellx - \mu\_Ref)} = 2^{(2-1)} = 2$) and the second slot of out each two slots is left as flexible.

In accordance with some examples of a subsampling methodology used with respect to a cells slot format combination table implementing an indirect technique, a length of sequences of slot format information corresponding to respective cells of a cell-group may be determined from a highest SFI reference SCS of the cells of the cell-group and the slot format information may be undersampled for any cell of the cell-group having a lower SFI reference SCS. For example, the largest SFI reference SCS in a cell-group may be used to determine the length of cell slot format combination sequences (e.g., CellsSlotFormatIndex). By way of example, for a cells slot format index combination comprising three cell slot format indices (e.g., CellsSlotFormatIndex={x0,x1,x2,x3}), cells with a SFI reference SCS value of 1 (e.g., SFI_μ=1) may use a corresponding subsampling of the three cell slot format indices (e.g., indices {x0,x2} of {x0,x1,x2,x3}) and cells with a SFI reference SCS value of 2 (e.g., SFI_μ=2) use the full cell slot format index sequence (e.g., indices {x0,x1,x2,x3}). Implementations of a subsampling methodology according to some aspects of the disclosure may implement a structural constraint on the particular of slot format sequences provided with respect to a cells slot format index combination to facilitate subsampling operation (e.g., indices x0 and x1 may be chosen jointly).

Figures 17A, 17B:
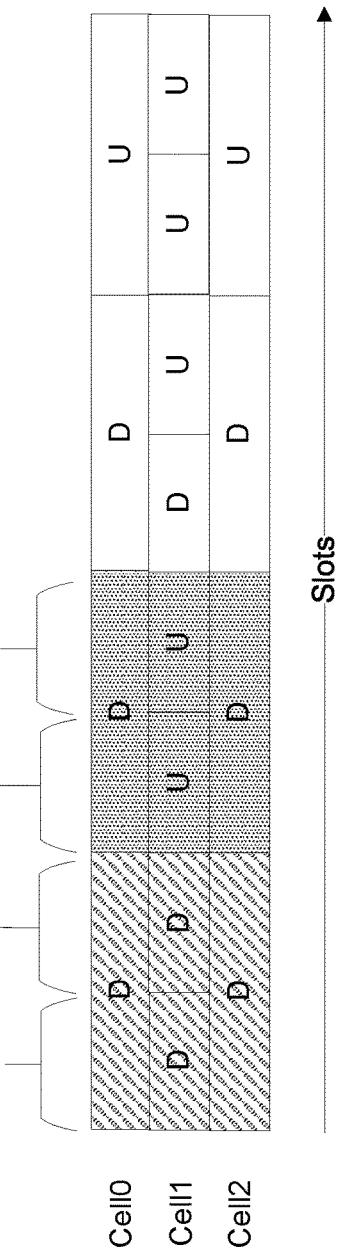
FIGS. 17A and 17B are block diagrams illustrating an example of cell-group SFI operation implementing a sub-sampling methodology according to one or more aspects.

FIGS. 17A and 17B show specific examples implementing the above subsampling methodology. In the examples of FIGS. 17A and 17B, the cell-groups comprise Cell0, Cell1, and Cell2, and the scheduling cell has the largest SFI reference SCS.

In the example of FIG. 17A, the SFI reference SCS of Cell0 (e.g., μ_SFI=0) and of Cell2 (e.g., μ_SFI=0) are lower than the SFI reference SCS of Cell1 (e.g., μ_SFI=1) and a cells slot format index combination of {0,0,2,2,0,2,1,1} is implemented, wherein the cells slot format indices of the combination correspond to the cells slot formats table above (e.g., CellsSlotFormatIndex=0→CellsSlotFormats {0 0 0}, CellsSlotFormatIndex=1→CellsSlotFormats {1 1 1}, and CellsSlotFormatIndex=2→CellsSlotFormats {0 1 0}). The cells slot format index combination may be subsampled for cells (e.g., Cell0 and Cell2) with a SFI reference SCS lower than the largest SFI reference SCS of a cell (e.g., Cell1) in the cell-group. In the illustrated example, Cell0 and Cell2 with a SFI reference SCS value of 0 (e.g., SFI_μ=0) use a subsampling of the sequence of cell slot format indices (e.g., indices {x0,x2,x4,x6} while Cell1 with a SFI reference SCS value of 1 (e.g., SFI_μ=1) uses all the cell slot format indices of the sequence of cell slot format indices (e.g., indices {x0,x1,x2,x3,x4,x5,x6,x7}).

In the example of FIG. 17B, the SFI reference SCS of Cell0 (e.g., μ_SFI=0) is lower that the SFI reference SCS of Cell1 (e.g., μ_SFI=1) and Cell2 (e.g., μ_SFI=1) and a cells slot format index combination of {0,0,2,2,0,2,3,1} is implemented, wherein the cells slot format indices of the combination correspond to the cells slot formats table above (e.g., CellsSlotFormatIndex=0→CellsSlotFormats {0 0 0}, CellsSlotFormatIndex=1→CellsSlotFormats {1 1 1}, CellsSlotFormatIndex=2→CellsSlotFormats {0 1 0}, and CellsSlotFormatIndex=3→CellsSlotFormats {1 0 1}). The cells slot format index combination may be subsampled for cells (e.g., Cell0) with a SFI reference SCS lower than the largest SFI reference SCS of a cell (e.g., Cell1 and Cell2) in the cell-group. In the illustrated example, Cell0 with a SFI reference SCS value of 0 (e.g., SFI_μ=0) uses a subsampling of the sequence of cell slot format indices (e.g., indices {x0,x2,x4,x6} while Cell1 and Cell2 with a SFI reference SCS value of 1 (e.g., SFI_μ=1) use all the cell slot format indices of the sequence of cell slot format indices (e.g., indices {x0,x1,x2,x3,x4,x5,x6,x7}).

In accordance with some examples of an interlacing methodology used with respect to a cells slot format combination table implementing an indirect technique, an interlaced payload structure may be applied with respect to cells having SFI reference SCS smaller than one or more cells in a cell-group. For example, one or more cells of a cell-group may have a higher SFI reference SCS than a SFI reference SCS associated with the SFI used to indicate the cells slot format. In accordance with some aspects of the disclosure, the cells slot format indicated by the SFI may provide an interlaced sequence of slot formats for the one or more cells. Each interlaced sequence may, for example, provide cells slot format information for one or more cells of the cell-group with a same SFI reference SCS. According to some examples of an interlaced payload structure, each $2^{(\mu\_max-\mu\_ref)}$ index is for a scheduling cell and the remaining indices ($2^{(\mu\_cells-\mu\_Ref)}-1$) are for cells with higher SFI reference SCS, where μ_max is the largest SFI reference SCS in a cell-group.

Figure 18:
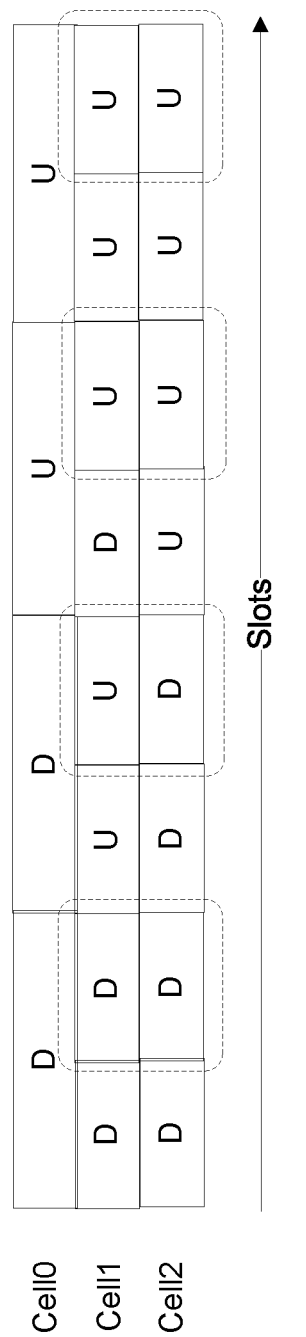
FIG. 18 is a block diagram illustrating an example of cell-group SFI operation implementing an interlacing methodology according to one or more aspects.

FIG. 18 shows a specific example implementing an interlacing methodology where Cell0 is the scheduling cell in a cell-group comprising Cell0, Cell1, and Cell2, and the SFI reference SCS of Cell0 (e.g., μ_SFI=0) is lower than the SFI reference SCS of Cell1 (e.g., μ_SFI=1) and Cell2 (e.g., μ_SFI=1). In the example of FIG. 18, a cells slot format index combination of {0,0,2,2,3,1,1,1} is implemented, wherein the cells slot format indices of the combination correspond to the cells slot formats table above (e.g., CellsSlotFormatIndex=0→CellsSlotFormats {0 0 0}, CellsSlotFormatIndex=1→CellsSlotFormats {1 1 1}, CellsSlotFormatIndex=2→CellsSlotFormats {0 1 0}, and CellsSlotFormatIndex=3→CellsSlotFormats {1 0 1}). In accordance with the example interlacing methodology implementation, interlaced indices of the cells slot format index (e.g., the bolded indices of {0,0,2,2,3,1,1,1}) correspond to slots of cells with a higher SFI reference SCS. For example, as shown in FIG. 18, the slot formats indicated by the dotted boxes correspond to the interlaced indices of the cells slot format indices according to the example interlacing methodology.

Various configurations of cells slot formats tables may be utilized with respect to interlacing methodology implementations according to aspects of the disclosure. For example, a consolidated cells slot formats table, wherein the cells slot formats that apply to all cells of a cell-group and the cells slot formats that apply to cells having a higher SFI reference SCS are included in one table, may be used for all cells in cell-group. An implementation of a consolidated cells slot format table corresponding to the example of FIG. 18 is shown below.

| Cells Slot Formats Table Consolidated | | | |
|---|---|---|---|
| | CellsSlotFormats | | |
| CellsSlotFormatIndex | Cell 0 | Cell 1 | Cell 2 |
| 0 | 0 | 00 | 00 |
| 1 | 1 | 11 | 11 |
| 2 | 0 | 11 | 00 |
| 3 | 1 | 00 | 11 |

As another example, group/sub-group cells slot formats tables, wherein the cells slot formats that apply to all cells of a cell-group are provided in a table and the cells slot formats that apply to cells having a higher SFI reference SCS are included in one or more additional tables, may be used for the cells in cell-group. An implementation of group/sub-group cells slot format tables corresponding to the example of FIG. 18 are shown below. According to a group/sub-group implementation of some aspects of the disclosure, the cell-group is divided into one or more sub-groups (e.g., sub-groups corresponding to the SFI reference SCS values that are larger than the SFI reference SCS of the scheduling cell), wherein cells in each sub-group have a same SFI reference SCS. In the example below, a cells slot formats table is provided for the cell-group (e.g., Cell0, Cell1, and Cell2) and a cells slot formats table is provided for a sub-group of the cells (e.g., Cell1 and Cell2).

| Cells Slot Formats Table Group | | | |
|---|---|---|---|
| | CellsSlotFormats | | |
| CellsSlotFormatIndex | Cell 0 | Cell 1 | Cell 2 |
| 0 | 0 | 0 | 0 |
| 1 | 1 | 1 | 1 |
| 2 | 0 | 1 | 0 |
| 3 | 1 | 0 | 1 |

| Cells Slot Formats Table Sub-Group (μ_SFI = 1) | | |
|---|---|---|
| | CellsSlotFormats | |
| CellsSlotFormatIndex | Cell 1 | Cell 2 |
| 0 | 0 | 0 |
| 1 | 1 | 1 |

| 2 | 1 | 0 |
|---|---|---|
| 3 | 0 | 1 |

Although the example of FIG. 18 shows a 1:1 interlacing pattern, it should be understood that the particular interlacing pattern utilized in any particular implementation according to some aspects may be configured to correspond to the SFI reference SCS values for the cells of a cell-group. Accordingly, interlacing patterns for the cells slot format indices (e.g., interlacing patterns of 1:2, 1:3, 2:1, 3:1, etc.) other than that of the illustrated example may be utilized according to aspects of the present disclosure.

Various methodologies for accommodating two or more cells of a cell-group having different SFI reference SCS may be utilized alone or in combination according to aspects of the present disclosure. In some examples, two or more of the above repetition, subsampling, and interlacing methodologies may be implemented in combination. For example, the SFI reference SCS of a scheduling cell may be utilized with respect to transmission of SFI information and a combination of both repetition (e.g., for cells having a higher SFI reference SCS) and subsampling (e.g., for cells having a lower SFI reference SCS) methodologies may be implemented for cells with different SFI reference SCS.

Although examples have been described with respect to determining/switching slot format types across cells, it should be understood that aspects of the present disclosure may be implemented with respect to determining/switching symbol format types within one or more cell-group slots (e.g., using special formats for mixed types of symbols (e.g., uplink symbols and downlink symbols) within a slot, such as slot formats indexed by format index numbers 3-55 of the slot format table shown above.

Figure 19:
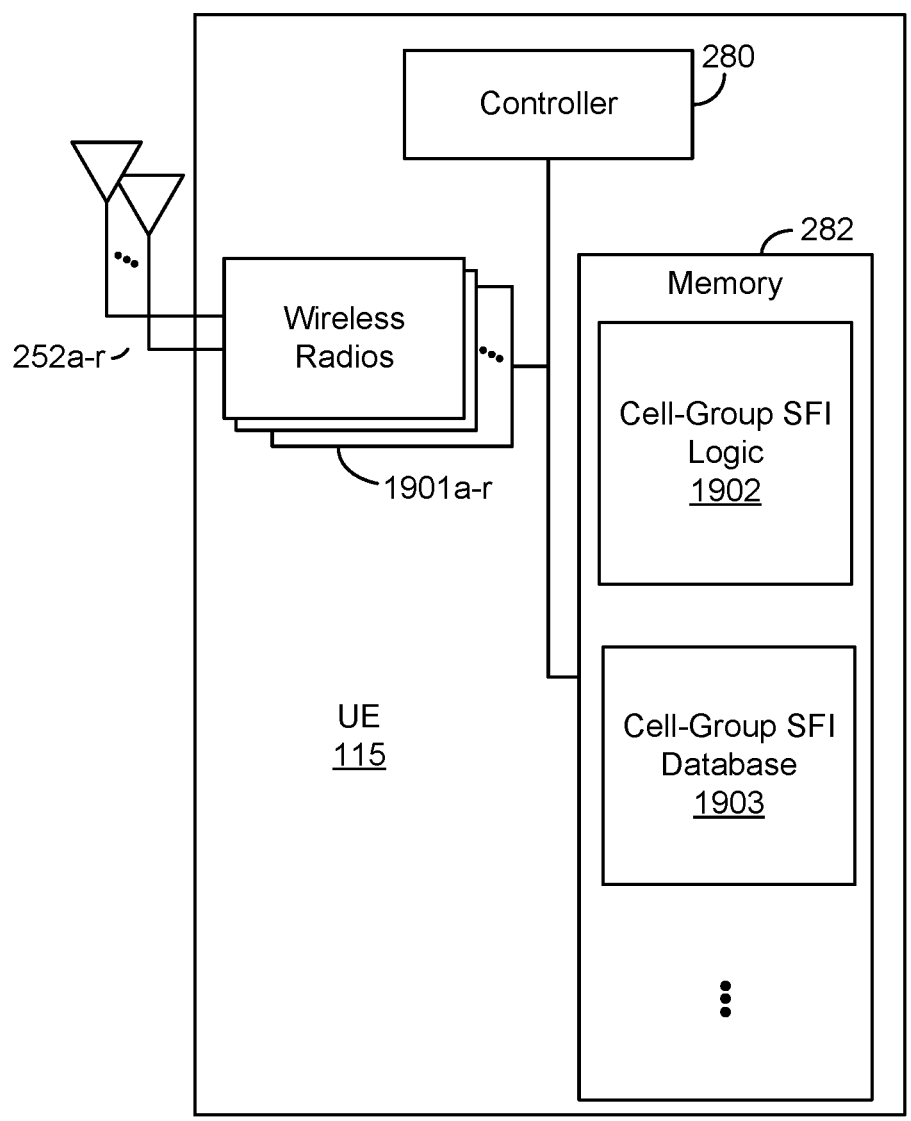
FIG. 19 is a block diagram of an example UE that supports cell-group SFI for dynamic cross-cell operation according to one or more aspects.

FIG. 19 is a block diagram of an example UE 115 that supports cell-group SFI for dynamic cross-cell operation, such as may support full duplex operation, according to one or more aspects of the disclosure. UE 115 may be configured to perform operations, including the blocks of a process described with reference to FIG. 11. In some implementations, UE 115 of the example in FIG. 19 includes the structure, hardware, and components shown and described with reference to UE 115 of FIGS. 1 and 2. For example, UE 115 may include controller 280, which operates to execute logic or computer instructions stored in memory 282, as well as controlling the components of UE 115 that provide the features and functionality of UE 115. UE 115, under control of controller 280, transmits and receives signals via wireless radios 1901a-r and antennas 252a-r. Wireless radios 1901a-r include various components and hardware, as illustrated in FIG. 2 for UE 115, including modulator and demodulators 254a-r, MIMO detector 256, receive processor 258, transmit processor 264, and TX MIMO processor 266.

As shown, memory 282 may include cell-group SFI logic 1902 and cell-group SFI database 1903. Cell-group SFI logic 1902 may be configured to perform and/or control one or more functions of cell-group SFI operation by UE 115, such as any or all of the functions described above with respect to process 1100 of FIG. 11. Cell-group SFI database 1903 may comprise various data and information relevant to cell-group SFI operation provided according to aspects of the disclosure. For example, cell-group SFI database 1903 may store information regarding support for one or more features with respect to cell-group SFI operation, configuration information regarding one or more cell-groups, information regarding an order of cells in one or more cell-groups, one or more cells slot format combination table for one or more cell-groups, cell-group SFI information, etc. UE 115 may receive signals from or transmit signals to one or more network entities, such as base station 105 of FIGS. 1, 2, and 20.

Figure 20:
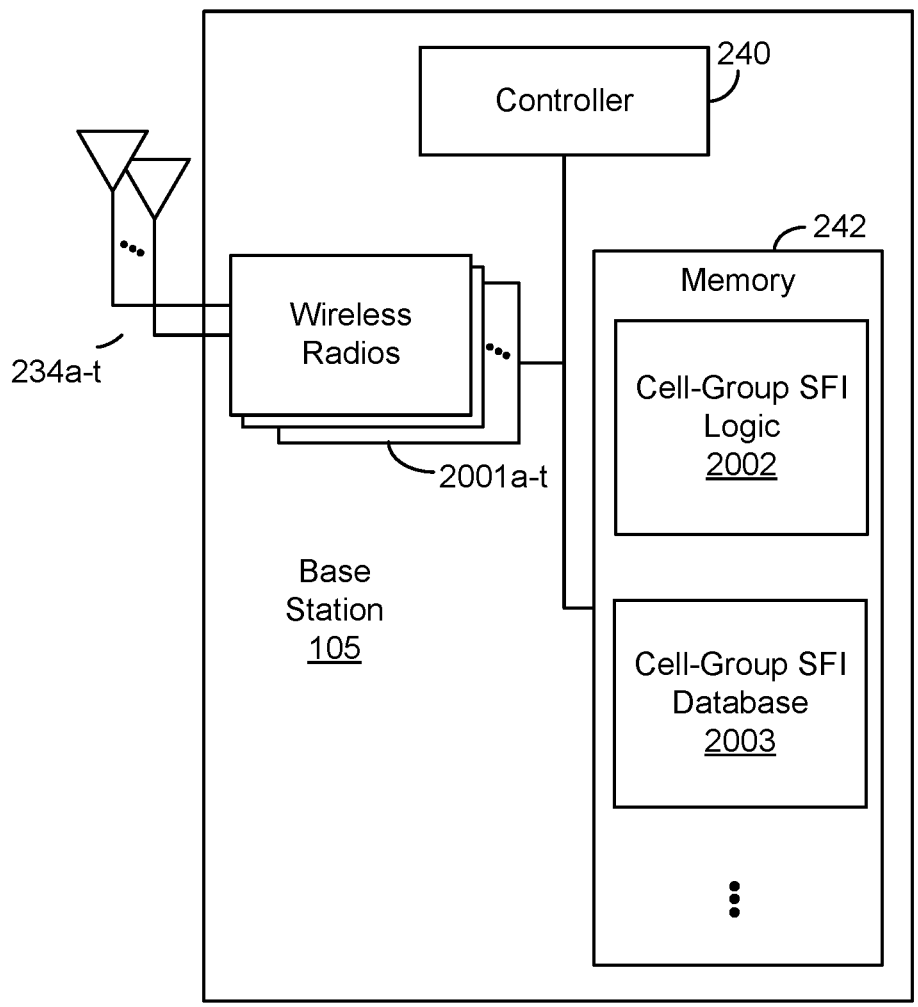
FIG. 20 is a block diagram of an example base station that supports cell-group SFI for dynamic cross-cell operation according to one or more aspects.

FIG. 20 is a block diagram of an example base station 105 that supports cell-group SFI for dynamic cross-cell operation, such as may support full duplex operation, according to one or more aspects of the disclosure. Base station 105 may be configured to perform operations, including the blocks of process 1000 described with reference to FIG. 10. In some implementations, base station 105 includes the structure, hardware, and components shown and described with reference to base station 105 of FIGS. 1 and 2. For example, base station 105 may include controller 240, which operates to execute logic or computer instructions stored in memory 242, as well as controlling the components of base station 105 that provide the features and functionality of base station 105. Base station 105, under control of controller 240, transmits and receives signals via wireless radios 2001a-t and antennas 234a-t. Wireless radios 2001a-t include various components and hardware, as illustrated in FIG. 2 for base station 105, including modulator and demodulators 232a-t, transmit processor 220, TX MIMO processor 230, MIMO detector 236, and receive processor 238.

As shown, memory 242 may include cell-group SFI logic 2002 and cell-group SFI database 2003. Cell-group SFI logic 2002 may be configured to perform and/or control one or more functions of cell-group SFI operation by base station 105, such as any or all of the functions described above with respect to process 1000 of FIG. 10. Cell-group SFI database 2003 may comprise various data and information relevant to cell-group SFI operation provided according to aspects of the disclosure. For example, cell-group SFI database 2003 may store information regarding UE support for one or more features with respect to cell-group SFI operation, configuration information regarding one or more cell-groups, information regarding an order of cells in one or more cell-groups, one or more cells slot format combination table for one or more cell-groups, cell-group SFI information, etc. Base station 105 may receive signals from or transmit signals to one or more UEs, such as UE 115 of FIGS. 1, 2, and 19.

It is noted that one or more blocks (or operations) described with reference to FIGS. 10 and 11 may be combined with one or more blocks (or operations) described with reference to another of the figures. For example, one or more blocks (or operations) of FIG. 10 may be combined with one or more blocks (or operations) of FIG. 20. As another example, one or more blocks associated with FIG. 11 may be combined with one or more blocks associated with FIG. 19. As another example, one or more blocks associated with FIG. 10 may be combined with one or more blocks (or operations) associated with FIG. 11. Additionally, or alternatively, one or more operations described above with reference to FIGS. 1 and 2 may be combined with one or more operations described with reference to FIGS. 19 and/or 20.

In some examples of methods, apparatuses, and articles described herein, various aspects of multi-slot transport block techniques may be implemented according to a multiplicity of combinations consistent with concepts described herein. Non-limiting examples of combinations of some aspects of a multi-slot transport block technique are set forth in the example clauses below.

1. Methods, apparatuses, and articles for wireless communication may provide for transmitting, to a UE, configuration information regarding one or more cell-groups supporting full duplex communication, an order of cells in each cell-group of the one or more cell groups, and a cells slot format combination table for all cells in a cell-group of the one or more cell-groups, and transmitting, to the UE, cell-group SFI information indicating a cells slot format of the cells slot format combination table to indicate to the UE slot formats for all cells in a selected cell-group of the one or more cell-groups.

2. The methods, apparatuses, and articles of clause 1, wherein the cell-group SFI information is carried via DCI transmitted by a base station of the one or more base stations, and wherein the cell-group SFI information is indicated as SFI pertaining to a cell-group based at least in part on a RNTI associated with the selected cell-group, or the cell-group SFI information is indicated as SFI pertaining to a cell-group based at least in part on an associated SS, CORESET, a scheduling cell of the selected cell-group, or a combination thereof associated with the selected cell-group.

3. The methods, apparatuses, and articles of any of clauses 1-2, further providing for transmitting, to the UE, SFI configuration information for cell-group SFI, wherein the SFI configuration information is associated with a scheduling cell of the cell-group and is configured for both decoding the cell-group SFI information and decoding per-cell SFI information, or the SFI configuration information is unique to the cell-group SFI.

4. The methods, apparatuses, and articles of any of clauses 1-3, wherein the cells slot format of the cell-group SFI information provides slot formats for a number of cell slots, and wherein the number of cell slots is greater than or equal to a SFI monitoring periodicity where the cells in the selected cell-group use the SFI monitoring periodicity, or the number of cell slots is greater than or equal to a largest SFI monitoring periodicity of a plurality of SFI monitoring periodicities where two or more cells in the selected cell-group have different SFI monitoring periodicity.

5. The methods, apparatuses, and articles of any of clauses 1-4, wherein the cells slot format of the cells slot format combination table directly provides a time sequence of slot formats for all cells of the selected cell-group.

6. The methods, apparatuses, and articles of clause 5, wherein the cells slot format comprises a plurality of blocks of at least size N, wherein size N is equivalent to a number of cells in the selected cell-group, and wherein each block of the plurality of blocks provides slot format information for each cell of the selected cell-group for a portion of time of the time sequence.

7. The methods, apparatuses, and articles of any of clauses 5-6, wherein two or more cells of the selected cell-group have different SFI reference SCS, wherein each block of the plurality of blocks comprises a plurality of sequences, wherein each sequence of the plurality of sequences corresponds to a respective cell of the cell-group and has a sequence length corresponding to the SFI reference SCS of the respective cell.

8. The methods, apparatuses, and articles of any of clauses 1-4, wherein the cells slot format of the cells slot format combination table provides a time sequence of indices, and wherein each index of the sequence of indices maps to a pattern of slot formats for the cells of the selected cell-group.

9. The methods, apparatuses, and articles of clause 8, wherein the indices of the cells slot format correspond to a cells slot formats table comprising slot format information for each cell of the selected cell-group.

10. The methods, apparatuses, and articles of any of clauses 8-9, wherein two or more cells of the selected cell-group have different SFI reference SCS, and wherein a length of sequences of slot format information corresponding to respective cells of the cell-group is determined from a lowest SFI reference SCS value of the cells of the selected cell-group and a slot format of the slot format information is repeated for any cell of the cell-group having a SFI reference SCS value greater than the lowest SFI reference SCS value, a length of sequences of slot format information corresponding to respective cells of the cell-group is determined from a highest SFI reference SCS value of the cells of the selected cell-group and the slot format information is undersampled for any cell of the cell-group having a SFI reference SCS value lower than the highest SFI reference SCS value, or a length of sequences of slot formation information corresponding to respective cells of the cell-group is determined from a SFI reference SCS value of a scheduling cell of the cell-group and a slot format of the slot format information is repeated for any cell of the cell-group having a SFI reference SCS value greater than the SFI reference SCS value of the scheduling cell and the slot format information is undersampled for any cell of the cell-group having a SFI reference SCS value lower than the SFI reference SCS value of the scheduling cell.

11. The methods, apparatuses, and articles of any of clauses 8-9, wherein one or more cells of the selected cell-group have higher SFI reference SCS value than a SFI reference SCS value associated with the SFI used to indicate the cells slot format, and wherein the cells slot format indicated by the SFI provides a first slot format of a sequence of slot formats for the one or more cells and a remaining number of slot formats of the sequence are left as having a flexible slot format.

12. The methods, apparatuses, and articles of any of clauses 8-9, wherein one or more cells of the selected cell-group have higher SFI reference SCS value than a SFI reference SCS value associated with the SFI used to indicate the cells slot format, wherein the cells slot format indicated by the SFI provides an interlaced sequence of slot formats for the one or more cells, and wherein each interlaced sequence provides cells slot format information for one or more cells of the selected cell-group with a same SFI reference SCS.

13. Methods, apparatuses, and articles for wireless communication may provide for receiving, from one or more base stations, configuration information regarding one or more cell-groups supporting full duplex communication, an order of cells in each cell-group of the one or more cell groups, and a cells slot format combination table for all cells in a cell-group of the one or more cell-groups, and receiving, from a base station of the one or more base stations, cell-group SFI information indicating a cells slot format of the cells slot format combination table for determining slot formats for all cells in a selected cell-group of the one or more cell-groups.

14. The methods, apparatuses, and articles of clause 26, further providing for receiving per-cell SFI information indicating a slot format for a same cell slot as indicated by the cells slot format indicated by the cell-group SFI information, wherein the UE expects the per-cell SFI information and the cell-group SFI information to indicate a same slot format, or the UE applies a priority metric to overwrite the slot format provided by one of the per-cell SFI information or the cell-group SFI information with the slot format provided by the other one of the per-cell SFI information or the cell-group SFI information.

15. The methods, apparatuses, and articles of any of clauses 13-14, further providing for transmitting, by the UE, an indication of support for one or more features utilized with respect to cross-cell operation using the one or more cell-groups, wherein the one or more features include at least one of a DCI format for cross-cells SFI, RRC configuration of the cells slot format combination table, RRC SFI configuration for cross-cell SFI, cell-group support for cells having different SFI reference SCS values, indirect cells slot format support using the cells slot format combination table, direct cells slot format support using the cells slot format combination table, repetition support for cell-groups including cells having different SFI reference SCS values, sub-sampling support for cell-groups including cells having different SFI reference SCS values, and interlacing support for cell-groups including cells having different SFI reference SCS values.

16. The methods, apparatuses, and articles of any of clauses 13-15, wherein the cell-group SFI information is carried via DCI received from the base station of the one or more base stations, further providing for identifying the cell-group SFI information as SFI pertaining to a cell-group based at least in part on a RNTI associated with the selected cell-group, or identifying the cell-group SFI information as SFI pertaining to a cell-group based at least in part on an associated SS, CORESET, a scheduling cell of the selected cell-group, or a combination thereof associated with the selected cell-group.

17. The methods, apparatuses, and articles of any of clauses 13-16, further providing for receiving SFI configuration information for cell-group SFI, wherein the SFI configuration information is associated with a scheduling cell of the cell-group and is used for both decoding the cell-group SFI information and decoding per-cell SFI information, or the SFI configuration information is unique to the cell-group SFI.

18. The methods, apparatuses, and articles of any of clauses 13-17, wherein cells slot format of the cell-group SFI information provides slot formats for a number of cell slots, and wherein the number of cell slots is greater than or equal to a SFI monitoring periodicity where the cells in the selected cell-group use the SFI monitoring periodicity, or the number of cell slots is greater than or equal to a largest SFI monitoring periodicity of a plurality of SFI monitoring periodicities where two or more cells in the selected cell-group have different SFI monitoring periodicity.

19. The methods, apparatuses, and articles of any of clauses 13-18, wherein the cells slot format of the cells slot format combination table directly provides a time sequence of slot formats for all cells of the selected cell-group.

20. The methods, apparatuses, and articles of clause 19, wherein the cells slot format comprises a plurality of blocks of at least size N, wherein size N is equivalent to a number of cells in the selected cell-group, and wherein each block of the plurality of blocks provides slot format information for each cell of the selected cell-group for a portion of time of the time sequence.

21. The methods, apparatuses, and articles of any of clauses 19-20, wherein two or more cells of the selected cell-group have different SFI reference SCS, wherein each block of the plurality of blocks comprises a plurality of sequences, wherein each sequence of the plurality of sequences corresponds to a respective cell of the cell-group and has a sequence length corresponding to the SFI reference SCS of the respective cell.

22. The methods, apparatuses, and articles of any of clauses 13-18, wherein the cells slot format of the cells slot format combination table provides a time sequence of indices, and wherein each index of the sequence of indices maps to a pattern of slot formats for the cells of the selected cell-group.

23. The methods, apparatuses, and articles of clause 22, wherein the indices of the cells slot format correspond to a cells slot formats table comprising slot format information for each cell of the selected cell-group.

24. The methods, apparatuses, and articles of any of clauses 22-23, wherein two or more cells of the selected cell-group have different SFI reference SCS, and wherein a length of sequences of slot format information corresponding to respective cells of the cell-group is determined from a lowest SFI reference SCS value of the cells of the selected cell-group and a slot format of the slot format information is repeated for any cell of the cell-group having a SFI reference SCS value greater than the lowest SFI reference SCS value, a length of sequences of slot format information corresponding to respective cells of the cell-group is determined from a highest SFI reference SCS value of the cells of the selected cell-group and the slot format information is undersampled for any cell of the cell-group having a SFI reference SCS value lower than the highest SFI reference SCS value, or a length of sequences of slot formation information corresponding to respective cells of the cell-group is determined from a SFI reference SCS value of a scheduling cell of the cell-group and a slot format of the slot format information is repeated for any cell of the cell-group having a SFI reference SCS value greater than the SFI reference SCS value of the scheduling cell and the slot format information is undersampled for any cell of the cell-group having a SFI reference SCS value lower than the SFI reference SCS value of the scheduling cell.

25. The methods, apparatuses, and articles of any of clauses 22-23, wherein one or more cells of the selected cell-group have lower SFI reference SCS value than a SFI reference SCS value associated with the SFI reference SFI used to indicate the cells slot format, and wherein the cells slot format indicated by the SFI provides a first slot format of a sequence of slot formats for the one or more cells and a remaining number of slot formats of the sequence are left as having a flexible slot format.

26. The methods, apparatuses, and articles of any of clauses 22-23, wherein one or more cells of the selected cell-group have lower SFI reference SCS value than a SFI reference SCS value associated with the SFI used to indicate the cells slot format, wherein the cells slot format indicated by the SFI provides an interlaced sequence of slot formats for the one or more cells, and wherein each interlaced sequence provides cells slot format information for one or more cells of the selected cell-group with a same SFI reference SCS.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1, 2, 10, 11, 19, and 20 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by one or more base stations, the method comprising:
   transmitting, to a user equipment (UE), configuration information regarding one or more cell-groups supporting full duplex communication, an order of cells in each cell-group of the one or more cell groups, and a cells slot format combination table for all cells in a cell-group of the one or more cell-groups, wherein each cell-group of the one or more cell-groups includes a plurality of cells for which a same cell-group slot format indication (SFI) applies, and wherein the cells slot format combination table includes a plurality of blocks that each include respective cells slot format combination information for a slot format sequence for the plurality of cells in a cell-group of the one or more cell-groups for a plurality of time slots; and
   transmitting, to the UE, a cell-group SFI (i) that is applicable to the plurality of cells in a selected cell-group of the one or more cell-groups and (ii) that indicates a selected block of the cells slot format combination table for a selected cells slot format combination for the plurality of cells in the selected cell-group, wherein the cells slot format combination provides a different slot format sequence over a plurality of time slots for cells of the plurality of cells in the selected cell-group of the one or more cell-groups.

2. The method of claim 1, wherein the cell-group SFI is carried via downlink control information (DCI) transmitted by a base station of the one or more base stations, and wherein
   the cell-group SFI is indicated as SFI pertaining to a cell-group based at least in part on a radio network temporary identifier (RNTI) associated with the selected cell-group, or
   the cell-group SFI is indicated as the SFI pertaining to the cell-group based at least in part on
      an associated search space (SS),
      control resource set (CORESET),
      a scheduling cell of the selected cell-group, or
      a combination thereof associated with the selected cell-group.

3. The method of claim 1, further comprising:
   transmitting, to the UE, SFI configuration information for cell-group SFI, wherein
      the SFI configuration information is associated with a scheduling cell of the cell-group and is configured for both decoding the cell-group SFI and decoding a per-cell SFI, or
      the SFI configuration information is unique to the cell-group SFI.

4. The method of claim 1, wherein the cells slot format combination of the cell-group SFI provides slot formats for a number of cell slots, and wherein
   the number of cell slots is greater than or equal to a SFI monitoring periodicity where the plurality of cells in the selected cell-group use the SFI monitoring periodicity, or
   the number of cell slots is greater than or equal to a largest SFI monitoring periodicity of a plurality of SFI monitoring periodicities where two or more cells of the plurality of cells in the selected cell-group have different SFI monitoring periodicity.

5. The method of claim 1, wherein the cells slot format combination of the cells slot format combination table directly provides a time sequence of slot formats over the plurality of time slots for all cells of the plurality of cells in the selected cell-group.

6. The method of claim 5, wherein the plurality of blocks are of at least size N, wherein size N is equivalent to a number of the plurality of cells in the selected cell-group, and wherein each block of the plurality of blocks provides slot format information for each cell of the selected cell-group for a portion of time of the time sequence.

7. The method of claim 6, wherein two or more cells of the plurality of cells in the selected cell-group have different SFI reference subcarrier spacing (SCS), wherein each block of the plurality of blocks comprises a plurality of sequences over the plurality of time slots, wherein each sequence of the plurality of sequences corresponds to a respective cell of the cell-group and has a sequence length corresponding to the SFI reference SCS of the respective cell.

8. The method of claim 1, wherein the cells slot format combination of the cells slot format combination table provides a time sequence of indices for the plurality of time slots, and wherein each index of the sequence of indices maps to a pattern of slot formats for the plurality of cells of the selected cell-group.

9. The method of claim 8, wherein the indices of the cells slot format combination correspond to a cells slot formats table comprising slot format information for each cell of the plurality of cells in the selected cell-group.

10. The method of claim 9, wherein two or more cells of the plurality of cells in the selected cell-group have different SFI reference subcarrier spacing (SCS), and wherein
- a length of sequences of slot format information corresponding to respective cells of the cell-group is determined from a lowest SFI reference SCS value of the cells of the plurality of cells in the selected cell-group and a slot format of the slot format information is repeated for any cell of the cell-group having a SFI reference SCS value greater than the lowest SFI reference SCS value,
- a length of sequences of slot format information corresponding to respective cells of the cell-group is determined from a highest SFI reference SCS value of the cells of the plurality of cells in the selected cell-group and the slot format information is undersampled for any cell of the cell-group having a SFI reference SCS value lower than the highest SFI reference SCS value, or
- a length of sequences of slot formation information corresponding to respective cells of the cell-group is determined from a SFI reference SCS value of a scheduling cell of the cell-group and a slot format of the slot format information is repeated for any cell of the cell-group having a SFI reference SCS value greater than the SFI reference SCS value of the scheduling cell and the slot format information is undersampled for any cell of the cell-group having a SFI reference SCS value lower than the SFI reference SCS value of the scheduling cell.

11. The method of claim 9, wherein one or more cells of the plurality of cells in the selected cell-group have higher SFI reference subcarrier spacing (SCS) value than a SFI reference SCS value associated with the SFI used to indicate the cells slot format combination, and wherein the cells slot format combination indicated by the SFI provides a first slot format of a sequence of slot formats for the one or more cells and a remaining number of slot formats of the sequence are left as having a flexible slot format.

12. The method of claim 9, wherein one or more cells of the plurality of cells in the selected cell-group have higher SFI reference subcarrier spacing (SCS) value than a SFI reference SCS value associated with the SFI used to indicate the cells slot format combination, wherein the cells slot format combination indicated by the SFI provides an interlaced sequence of slot formats for the one or more cells, and wherein each interlaced sequence provides cells slot format information for one or more cells of the selected cell-group with a same SFI reference SCS.

13. A base station comprising:
- a processing system that includes at least one processor and a memory coupled with the at least one processor, the processing system configured to cause the base station to:
  - transmit, to a user equipment (UE), configuration information regarding one or more cell-groups supporting full duplex communication, an order of cells in each cell-group of the one or more cell groups, and a cells slot format combination table for all cells in a cell-group of the one or more cell-groups, wherein each cell-group of the one or more cell-groups includes a plurality of cells for which a same cell-group slot format indication (SFI) applies, and wherein the cells slot format combination table includes a plurality of blocks that each include respective cells slot format combination information for a slot format sequence for the plurality of cells in a cell-group of the one or more cell-groups for a plurality of time slots; and
  - transmit, to the UE, a cell-group SFI (i) that is applicable to the plurality of cells in a selected cell-group of the one or more cell-groups and (ii) that indicates a selected block of the cells slot format combination table for a selected cells slot format combination for the plurality of cells in the selected cell-group, wherein the cells slot format combination provides a different slot format sequence over a plurality of time slots for cells of the plurality of cells in the selected cell-group of the one or more cell-groups.

14. The base station of claim 13, wherein the cells slot format combination of the cells slot format combination table directly provides a time sequence of slot formats over the plurality of time slots for all cells of the plurality of cells in the selected cell-group or the cells slot format combination of the cells slot format combination table provides a time sequence of indices for the plurality of time slots and each index of the sequence of indices maps to a pattern of slot formats for the plurality of cells in the selected cell-group.

15. A method of wireless communication performed by a user equipment (UE), the method comprising:
- receiving, from one or more base stations, configuration information regarding one or more cell-groups supporting full duplex communication, an order of cells in each cell-group of the one or more cell groups, and a cells slot format combination table for all cells in a cell-group of the one or more cell-groups, wherein each cell-group of the one or more cell-groups includes a plurality of cells for which a same cell-group slot format indication (SFI) applies, and wherein the cells slot format combination table includes a plurality of blocks that each include respective cells slot format combination information for a slot format sequence for the plurality of cells in a cell-group of the one or more cell-groups for a plurality of time slots; and
- receiving, from a base station of the one or more base stations, a cell-group SFI (i) that is applicable to the plurality of cells in a selected cell-group of the one or more cell-groups and (ii) that indicates a selected block of the cells slot format combination table for a selected cells slot format combination for the plurality of cells in the selected cell-group, wherein the cells slot format combination provides a different slot format sequence over a plurality of time slots for cells of the plurality of cells in the selected cell-group of the one or more cell-groups.

16. The method of claim 15, further comprising:
receiving a per-cell SFI indicating a slot format for a same cell slot as indicated by the cells slot format combination indicated by the cell-group SFI, wherein
- the UE expects the per-cell SFI and the cell-group SFI to indicate a same slot format, or
- the UE applies a priority metric to overwrite the slot format provided by one of the per-cell SFI or the cell-group SFI with the slot format provided by the other one of the per-cell SFI or the cell-group SFI.

17. The method of claim 15, further comprising:
transmitting, by the UE, an indication of support for one or more features utilized with respect to cross-cell operation using the one or more cell-groups, wherein the one or more features include at least one of
a downlink control information (DCI) format for cross-cells SFI,
radio resource control (RRC) configuration of the cells slot format combination table,
RRC SFI configuration for cross-cell SFI,
cell-group support for cells having different SFI reference subcarrier spacing (SCS) values,
indirect cells slot format support using the cells slot format combination table,
direct cells slot format support using the cells slot format combination table,
repetition support for cell-groups including cells having different SFI reference SCS values,
subsampling support for cell-groups including cells having different SFI reference SCS values, and
interlacing support for cell-groups including cells having different SFI reference SCS values.

18. The method of claim 15, wherein the cell-group SFI is carried via downlink control information (DCI) received from the base station of the one or more base stations, further comprising:
identifying the cell-group SFI as the SFI pertaining to the cell-group based at least in part on a radio network temporary identifier (RNTI) associated with the selected cell-group, or
identifying the cell-group SFI as the SFI pertaining to the cell-group based at least in part on
an associated search space (SS),
control resource set (CORESET),
a scheduling cell of the selected cell-group, or
a combination thereof associated with the selected cell-group.

19. The method of claim 15, further comprising:
receiving SFI configuration information for cell-group SFI, wherein
the SFI configuration information is associated with a scheduling cell of the cell-group and is used for both decoding the cell-group SFI and decoding a per-cell SFI, or
the SFI configuration information is unique to the cell-group SFI.

20. The method of claim 15, wherein cells slot format combination of the cell-group SFI provides slot formats for a number of cell slots, and wherein
the number of cell slots is greater than or equal to a SFI monitoring periodicity where the plurality of cells in the selected cell-group use the SFI monitoring periodicity, or
the number of cell slots is greater than or equal to a largest SFI monitoring periodicity of a plurality of SFI monitoring periodicities where two or more cells of the plurality of cells in the selected cell-group have different SFI monitoring periodicity.

21. The method of claim 15, wherein the cells slot format combination of the cells slot format combination table directly provides a time sequence of slot formats over the plurality of time slots for all cells of the selected cell-group.

22. The method of claim 21, wherein the plurality of blocks are of at least size N, wherein size N is equivalent to a number of the plurality of cells in the selected cell-group, and wherein each block of the plurality of blocks provides slot format information for each cell of the plurality of cells in the selected cell-group for a portion of time of the time sequence.

23. The method of claim 22, wherein two or more cells of the plurality of cells in the selected cell-group have different SFI reference subcarrier spacing (SCS), wherein each block of the plurality of blocks comprises a plurality of sequences over the plurality of time slots, wherein each sequence of the plurality of sequences corresponds to a respective cell of the cell-group and has a sequence length corresponding to the SFI reference SCS of the respective cell.

24. The method of claim 15, wherein the cells slot format combination of the cells slot format combination table provides a time sequence of indices for the plurality of time slots, and wherein each index of the sequence of indices maps to a pattern of slot formats for the plurality of cells of the selected cell-group.

25. The method of claim 24, wherein the indices of the cells slot format combination correspond to a cells slot formats table comprising slot format information for each cell of the plurality of cells in the selected cell-group.

26. The method of claim 25, wherein two or more cells of the plurality of cells in the selected cell-group have different SFI reference subcarrier spacing (SCS), and wherein
a length of sequences of slot format information corresponding to respective cells of the cell-group is determined from a lowest SFI reference SCS value of the plurality of cells of the selected cell-group and a slot format of the slot format information is repeated for any cell of the cell-group having a SFI reference SCS value greater than the lowest SFI reference SCS value,
a length of sequences of slot format information corresponding to respective cells of the cell-group is determined from a highest SFI reference SCS value of the plurality of cells of the selected cell-group and the slot format information is undersampled for any cell of the cell-group having a SFI reference SCS value lower than the highest SFI reference SCS value, or
a length of sequences of slot formation information corresponding to respective cells of the cell-group is determined from a SFI reference SCS value of a scheduling cell of the cell-group and a slot format of the slot format information is repeated for any cell of the cell-group having a SFI reference SCS value greater than the SFI reference SCS value of the scheduling cell and the slot format information is undersampled for any cell of the cell-group having a SFI reference SCS value lower than the SFI reference SCS value of the scheduling cell.

27. The method of claim 25, wherein one or more cells of the plurality of cells in the selected cell-group have lower SFI reference subcarrier spacing (SCS) value than a SFI reference SCS value associated with the SFI used to indicate the cells slot format combination, and wherein the cells slot format combination indicated by the SFI provides a first slot format of a sequence of slot formats for the one or more cells and a remaining number of slot formats of the sequence are left as having a flexible slot format.

28. The method of claim 25, wherein one or more cells of the plurality of cells in the selected cell-group have lower SFI reference subcarrier spacing (SCS) value than a SFI reference SCS value associated with the SFI used to indicate the cells slot format combination, and wherein the cells slot format combination indicated by the SFI provides an interlaced sequence of slot formats for the one or more cells, and wherein each interlaced sequence provides cells slot format information for one or more cells of the selected cell-group with a same SFI reference SCS.

29. A user equipment (UE) comprising:
a processing system that includes at least one processor and a memory coupled with the at least one processor, the processing system configured to cause the UE to:
receive, from one or more base stations, configuration information regarding one or more cell-groups supporting full duplex communication, an order of cells in each cell-group of the one or more cell groups, and a cells slot format combination table for all cells in a cell-group of the one or more cell-groups, wherein each cell-group of the one or more cell-groups includes a plurality of cells for which a same cell-group slot format indication (SFI) applies, and wherein the cells slot format combination table includes a plurality of blocks that each include respective cells slot format combination information for a slot format sequence for the plurality of cells in a cell-group of the one or more cell-groups for a plurality of time slots; and
receive, from a base station of the one or more base stations, a cell-group SFI (i) that is applicable to the plurality of cells in a selected cell-group of the one or more cell-groups and (ii) that indicates a selected block of the cells slot format combination table for a selected cells slot format combination for the plurality of cells in the selected cell-group, wherein the cells slot format combination provides a different slot format sequence over a plurality of time slots for cells of the plurality of cells in the selected cell-group of the one or more cell-groups.

30. The UE of claim 29, wherein the cells slot format combination of the cells slot format combination table directly provides a time sequence of slot formats over the plurality of time slots for all cells of the selected cell-group or the cells slot format combination of the cells slot format combination table provides a time sequence of indices for the plurality of time slots and each index of the sequence of indices maps to a pattern of slot formats for the plurality of cells of the selected cell-group.

* * * * *